United States Patent
Shibayama et al.

(10) Patent No.: US 12,019,885 B2
(45) Date of Patent: Jun. 25, 2024

(54) INFORMATION PROCESSING SYSTEM AND CONFIGURATION MANAGEMENT METHOD INCLUDING STORAGE NODES CONNECTED BY NETWORK

(71) Applicant: Hitachi, Ltd., Tokyo (JP)

(72) Inventors: Tsukasa Shibayama, Tokyo (JP); Takanobu Suzuki, Tokyo (JP); Akira Deguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 20 days.

(21) Appl. No.: 17/945,769

(22) Filed: Sep. 15, 2022

(65) Prior Publication Data

US 2023/0205439 A1 Jun. 29, 2023

(51) Int. Cl.
*G06F 3/06* (2006.01)

(52) U.S. Cl.
CPC .......... *G06F 3/0635* (2013.01); *G06F 3/0619* (2013.01); *G06F 3/0647* (2013.01); *G06F 3/067* (2013.01)

(58) Field of Classification Search
CPC .... G06F 3/0635; G06F 3/0619; G06F 3/0647; G06F 3/067; G06F 11/201; G06F 11/2069; G06F 11/2092; G06F 3/0644; G06F 11/2094
See application file for complete search history.

(56) References Cited

U.S. PATENT DOCUMENTS

| | | | |
|---|---|---|---|
| 10,203,890 B1* | 2/2019 | Lathia | G06F 11/0757 |
| 2018/0121091 A1* | 5/2018 | Tokoro | G06F 3/0644 |
| 2018/0232142 A1* | 8/2018 | Shekar | G06F 11/2046 |
| 2018/0336106 A1* | 11/2018 | Cao | G06F 11/2097 |
| 2019/0163395 A1 | 5/2019 | Ito et al. | |
| 2019/0310925 A1* | 10/2019 | Yoshida | G06F 3/065 |

FOREIGN PATENT DOCUMENTS

| | | |
|---|---|---|
| JP | 2019-101702 A | 6/2019 |
| JP | 2019-185328 A | 10/2019 |

OTHER PUBLICATIONS

Office Action received in Japanese Patent Application No. 2021-209695, dated Dec. 12, 2023, 8 pages (with translation).

* cited by examiner

*Primary Examiner* — Sean D Rossiter
(74) *Attorney, Agent, or Firm* — Procopio, Cory, Hargreaves & Savitch LLP

(57) ABSTRACT

In an information processing system, a plurality of control units (control software) implemented in different storage nodes are managed as a redundancy group, one or more first logical units (SLUs) are associated with the redundancy group, and the plurality of control units included in the redundancy group include an active control unit that processes an input/output (IO) request with respect to the first logical unit, and a standby control unit that takes over the processing when the active control unit fails. A processor (configuration management unit) arranges at least one second logical unit (ALU) in the storage node in which the active control unit exists, and associates the second logical unit with the first logical unit controlled by the active control unit.

14 Claims, 22 Drawing Sheets

FIG. 7

| NODE ID (641) | RESOURCE TYPE (642) | RESOURCE ID (643) | VALUE (644) |
|---|---|---|---|
| 1 | Port | P1 | aaa |
| | | P2 | bbb |
| | | ... | |
| | Drive | D1 | 100GB |
| | | D2 | 100GB |
| | | ... | |
| 2 | Port | P3 | ccc |
| | | P4 | ddd |
| | | ... | |
| | Drive | D5 | 200GB |
| | | D6 | 200GB |
| | | ... | |
| ... | | ... | ... |

| STORAGE CONTROLLER ID | STATE | SCG ID | NODE ID | MANAGEMENT CAPACITY | AVAILABLE CAPACITY |
|---|---|---|---|---|---|
| 1 | Active | 1 | 1 | 1TB | 500GB |
| 2 | Standby | 1 | 2 | | |
| 3 | Active | 2 | 2 | 2TB | 1TB |
| 4 | Standby | 2 | 3 | | |
| 5 | Active | 3 | 3 | 1TB | 100GB |
| 6 | Dead | 3 | 4 | | |
| 7 | Dead | 4 | 4 | 2TB | 500GB |
| 8 | Active | 4 | 1 | | |
| ... | ... | ... | ... | | |

| ALU ID (621) | NAME (622) | SCG ID (623) |
|---|---|---|
| 1 | ALU#1 | 1 |
| 2 | ALU#2 | 1 |
| 3 | ALU#3 | 2 |
| ... | ... | ... |

| SLU ID (631) | NAME (632) | CAPACITY (633) | SCG ID (634) | ALU ID (635) |
|---|---|---|---|---|
| 1 | SLU#1 | 100 | 1 | 1 |
| 2 | SLU#2 | 200 | 1 | N/A |
| 3 | SLU#3 | 400 | 2 | 3, 4 |
| ... | ... | ... | ... | ... |

| HOST ID | TYPE | MAXIMUM SETTABLE PATH NUMBER | INITIATOR ID |
|---|---|---|---|
| 1 | AA | 8 | I1 |
|   |    |   | I2 |
|   |    |   | ... |
| 2 | BB | 4 | I3 |
|   |    |   | I4 |
| ... |  |  | ... |

661 — HOST ID
662 — TYPE
663 — MAXIMUM SETTABLE PATH NUMBER
664 — INITIATOR ID

| ALU ID | HOST ID | INITIATOR ID | NODE ID | TARGET ID | PRIORITY FLAG |
|---|---|---|---|---|---|
| 1 | 1 | I1 | 1 | P1 | Yes |
|   |   |    | 2 | P3 | No |
|   | 2 | I3 | 1 | P2 | Yes |
|   |   |    | 2 | P4 | No |
|   | ... | ... |  |  |  |
| 2 | 1 | I1 | 2 | P3 | Yes |
|   |   |    | 3 | P5 | No |
| ... | ... | ... | ... |  |  |

671 — ALU ID
672 — HOST ID
673 — INITIATOR ID
674 — NODE ID
675 — TARGET ID
676 — PRIORITY FLAG

FIG. 16

| SLU ID | NAME | CAPACITY | SCG ID | ALU ID | APP ID |
|---|---|---|---|---|---|
| 1 | SLU#1 | 100 | 1 | 1 | 1 |
| 2 | SLU#2 | 200 | 1 | N/A | 1 |
| 3 | SLU#3 | 400 | 2 | 3, 4 | 2 |
| ... | ... | ... | ... | ... | |

FIG. 20

| | | | | | 72 |
| 721 | 722 | 723 | 724 | 725 | 726 |
|---|---|---|---|---|---|
| NODE ID | RESOURCE TYPE | RESOURCE ID | METRIC | TIME | AMOUNT |
| 1 | CPU | CPU1 | CPU UTILIZATION RATE | 10:00:00 | 30% |
| | | | | 10:00:05 | 20% |
| | | | | ... | |
| | | ... | | | |
| | Port | Port1 | Port IO NUMBER | 10:00:00 | 500 |
| | | | | ... | |
| | | ... | | | |
| | Drive | Drive1 | Drive OPERATION RATE | 10:00:00 | 30% |
| | | | | ... | |
| | | ... | | | |
| | ALU | ALU1 | Operation NUMBER | 10:00:00 | 50 |
| | | | | ... | |
| | | ... | | | |
| | SLU | SLU1 | Read IO NUMBER | 10:00:00 | 100 |
| | | | | 10:00:05 | 110 |
| | | | | ... | |
| | | | Write IO NUMBER | 10:00:00 | 100 |
| | | | | 10:00:05 | 110 |
| | | | | ... | |
| | | ... | | | |
| 2 | ... | | | | |
| ... | | | | | |

FIG. 23

| SLU ID | NAME | CAPACITY | SCG ID | ALU ID | APP ID | APP NODE ID |
|---|---|---|---|---|---|---|
| 1 | SLU#1 | 100 | 1 | 1 | 1 | 1 |
| 2 | SLU#2 | 200 | 1 | N/A | 1 | 1 |
| 3 | SLU#3 | 400 | 2 | 3, 4 | 2 | 2 |
| ... | ... | ... | ... | ... | | |

INFORMATION PROCESSING SYSTEM AND CONFIGURATION MANAGEMENT METHOD INCLUDING STORAGE NODES CONNECTED BY NETWORK

BACKGROUND OF THE INVENTION

1. Field of the Invention

The present invention relates to an information processing system and a configuration management method, and is suitably applied to an information processing system that provides a virtual volume from storage of a plurality of nodes and a configuration management method thereof.

2. Description of the Related Art

In recent years, a software-defined storage (SDS) constructed by implementing storage control software in a general-purpose server device (hereinafter, referred to as a storage node) has attracted attention. The demand for the SDS is increasing because it does not require dedicated hardware and has high scalability. As an information processing system using the SDS, an information processing system is known in which a plurality of storage nodes in each of which one or more SDSs are implemented are combined to form one cluster, and the cluster is provided as one storage device to a higher-order device (hereinafter, referred to as a host).

For example, JP 2019-185328 A discloses an information processing system that provides a virtual logical volume (virtual volume) from a plurality of storage nodes in which the SDS is implemented. In the information processing system of JP 2019-185328 A, storage controllers (control software) form a redundancy configuration in an active-standby combination across a plurality of storage nodes, and a combination of the storage controllers is connected in a row among the storage nodes. Furthermore, in the information processing system of JP 2019-185328 A, a plurality of paths (multipaths) from the host device to the storage node can be set, a first prioritized path is set for the storage node where active control software exists, and a second prioritized path is set for the storage node where standby control software exists. The information processing system of JP 2019-185328 A can continue execution of input/output (IO) with respect to the virtual volume by switching a path to be used according to the priority in a case where a failure occurs in the active control software and the standby control software is promoted to active due to such multipath setting, so that it is possible to implement a path redundancy configuration.

SUMMARY OF THE INVENTION

Meanwhile, in a conglomerate LUN structure of a small computer system interface (SCSI), in a storage node, one or more subsidiary logical units (SLUs) that provide a logical volume based on a physical storage device and an administrative logical unit (ALU) that serves as an IO reception port for the SLU are created, all accesses from the host are performed via the ALU, and an SCSI architecture model in which the ALU distributes IO to the SLU bound with its own ALU is disclosed. In this SCSI architecture model, as long as the host can recognize only the ALU bound to the processing target SLU, the host can execute IO with the SLU via the ALU. At this time, in a case of a straight relationship in which the IO processing path (specifically, a path from an initiator on the host side to the ALU via a target on the storage node side and binding from the ALU to the SLU) does not straddle different storage nodes, high IO performance and high reliability due to data locality can be expected.

However, in a case where the information processing system of JP 2019-185328 A is to be implemented by the above-described SCSI architecture model, although the target, the ALU, and the SLU can be constructed in a straight relationship during normal operation, there is a possibility that the straight relationship cannot be maintained in a case where a storage configuration is changed due to an addition or removal of a storage node. In a case where the straight relationship is broken and a connection configuration across the storage nodes is established, IO processing is performed via an external network connecting the storage nodes. Therefore, it takes more processing time than that in a case where the IO processing is performed via an internal network of the same storage nodes, and the IO performance deteriorates. In addition, since the IO processing performed via the external network, the reliability is also lowered.

The present invention has been made in view of the above points, and an object of the present invention is to propose an information processing system and a configuration management method capable of implementing redundancy of data control and suppressing deterioration of IO performance and reliability during system operation in an information processing system that provides a virtual volume from storage of a plurality of nodes.

An aspect of the present invention provides an information processing system including: a plurality of storage nodes each including one or more processors; and a storage device, in which the plurality of storage nodes are connected by a network, the storage node includes: a first logical unit that is a logical storage region; a second logical unit that has a connection relationship with the first logical unit and serves as a reception port of an input/output (IO) request for data stored in the first logical unit having the connection relationship; and a control unit that operates on the processor and processes the IO request with respect to the first logical unit, a plurality of the control units implemented in different storage nodes are managed as a redundancy group, and one or more first logical units are associated with the redundancy group, the plurality of control units included in the redundancy group include an active control unit that processes the IO request with respect to the first logical unit associated with the redundancy group and a standby control unit that takes over the processing when the active control unit fails, and the processor arranges at least one second logical unit in the storage node in which the active control unit exists, and associates the second logical unit with the first logical unit controlled by the active control unit.

Another aspect of the present invention provides a configuration management method of an information processing system including a plurality of storage nodes each including one or more processors, and a storage device, in which the plurality of storage nodes are connected by a network, the storage node includes: a first logical unit that is a logical storage region; a second logical unit that has a connection relationship with the first logical unit and serves as a reception port of an input/output (IO) request for data stored in the first logical unit having the connection relationship; and a control unit that operates on the processor and processes the IO request with respect to the first logical unit, a plurality of the control units implemented in different storage nodes are managed as a redundancy group, and one or more first logical units are associated with the redundancy group, the plurality of control units included in the redundancy group include an active control unit that processes the IO request with respect to the first logical unit associated with the redundancy group and a standby control unit that takes over the processing when the active control unit fails, and the processor arranges at least one second logical unit in the storage node in which the active control unit exists, and associates the second logical unit with the first logical unit controlled by the active control unit.

According to the present invention, it is possible to implement redundancy of data control and suppress deterioration of IO performance and reliability during system operation in an information processing system that provides a virtual volume using a plurality of storage nodes.

BRIEF DESCRIPTION OF THE DRAWINGS

FIG. 7 is a diagram illustrating an example of a system management table;

FIG. 8 is a diagram illustrating an example of a control software management table;

FIG. 9 is a diagram illustrating an example of an ALU management table;

FIG. 10 is a diagram illustrating an example of an SLU management table;

FIG. 11 is a diagram illustrating an example of a host management table;

FIG. 12 is a diagram illustrating an example of a path management table;

FIG. 16 is a diagram illustrating an example of an SLU management table according to a second embodiment;

FIG. 20 is a diagram illustrating an example of a system operation information management table;

FIG. 23 is a diagram illustrating an example of an SLU management table according to the fifth embodiment.

DESCRIPTION OF THE PREFERRED EMBODIMENTS

Figure 1:
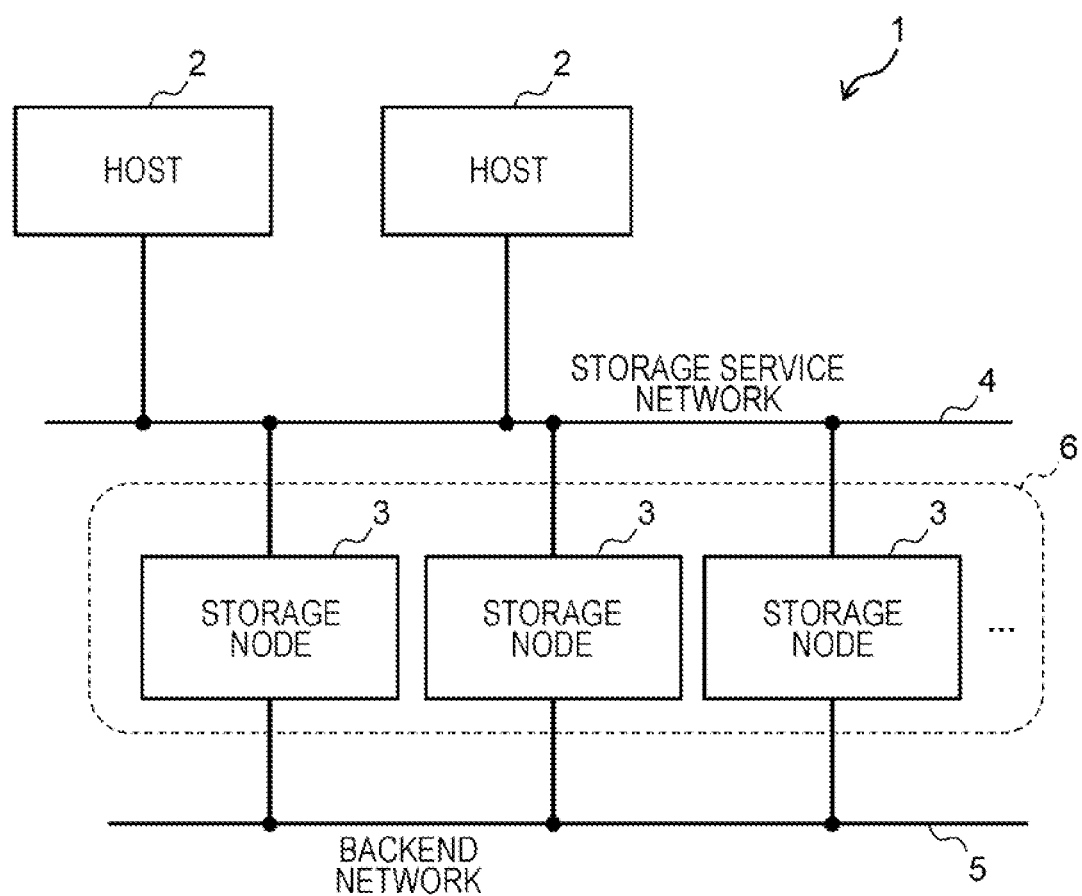
FIG. 1 is a block diagram illustrating an overall configuration example of an information processing system according to a first embodiment of the present invention.

Hereinafter, embodiments of the present invention will be described in detail with reference to the drawings.

Note that the following description and drawings are examples for describing the present invention, and omission and simplification are appropriately made for clarity of description. In addition, not all combinations of features described in the embodiments are essential to the solution of the invention. The present invention is not limited to the embodiments, and all application examples consistent with the idea of the present invention fall within the technical scope of the present invention. Those skilled in the art can make various additions, modifications, and the like to the present invention without departing from the scope of the present invention. The present invention can be carried out in various other forms. Unless otherwise specified, each component may be plural or singular. For example, although a plurality of embodiments according to the present invention will be described below, in these embodiments, it is possible to replace a part of a configuration of an embodiment with a configuration of another embodiment, add a configuration of an embodiment to a configuration of another embodiment, or perform addition of another configuration, deletion, or replacement with another configuration with respect to a part of a configuration of each embodiment.

In the following description, various types of information may be described with expressions such as "table", "list", and "queue", but the various types of information may be expressed with any other data structure. An "XX table", an "XX list", and the like may be referred to as "XX information" to indicate that they do not depend on the data structure. In describing the content of each piece of information, expressions such as "identification information", "identifier", "name", "ID", and "number" are used, but these can be replaced with each other.

In addition, in the following description, in a case where the same kind of elements are described without being distinguished from each other, reference numerals or common numbers in reference numerals may be used, and in a case where the same kind of elements are described while being distinguished from each other, reference numerals of the elements may be used, or IDs assigned to the elements may be used instead of the reference numerals.

In addition, in the following description, processing performed by executing a program may be described. However, the program is executed by at least one processor (for example, a central processing unit (CPU)) to perform predetermined processing by using a storage resource (for example, a memory) and/or an interface device (for example, a communication port) as appropriate. Therefore, the subject of the processing may be the processor. Similarly, the subject of the processing performed by executing the program may be a controller, a device, a system, a computer, a node, a storage system, a storage device, a server, a management computer, a client, or a host including the processor. The subject (for example, a processor) of the processing performed by executing the program may include a hardware circuit that performs a part of or the entire processing. For example, the subject of the processing performed by executing the program may include a hardware circuit that performs encryption and decryption or compression and decompression. The processor operates as functional units that implement predetermined functions by operating according to the program. A device and system including the processor are a device and system including these functional units.

The program may be installed in a device such as a computer from a program source. The program source may be, for example, a program distribution server or a computer-readable storage medium. In a case where the program source is a program distribution server, the program distribution server includes a processor (for example, a CPU) and a storage resource, and the storage resource may further store a distribution program and a program to be distributed. Further, the processor of the program distribution server may distribute the program to be distributed to another computer by executing the distribution program. In the following description, two or more programs may be implemented as one program, or one program may be implemented as two or more programs.

An administrative logical unit (ALU) and a subsidiary logical unit (SLU) used in each of the following embodiments are logical units (LUs) whose specifications are defined in a conglomerate LUN structure which is a small computer system interface (SCSI) architecture model. In the architecture model, the SLU is a virtual logical volume (virtual volume) based on a storage device that stores actual data. In other words, the SLU is a logical unit as a logical storage region based on a physical storage region of a storage device. The ALU is a volume serving as a reception port of an access (input/output (IO) request) from a host to an SLU having a connection relationship with (bound with) the ALU, and distributes the received IO request to the SLU. That is, in an information processing system of the present description, an IO request from a host is transmitted to an ALU connected to an SLU storing target data as a destination, and the ALU receiving the IO request serves as a gateway to distribute the IO request to the SLU.

(1) First Embodiment (1-1) System Configuration

Figure 2:
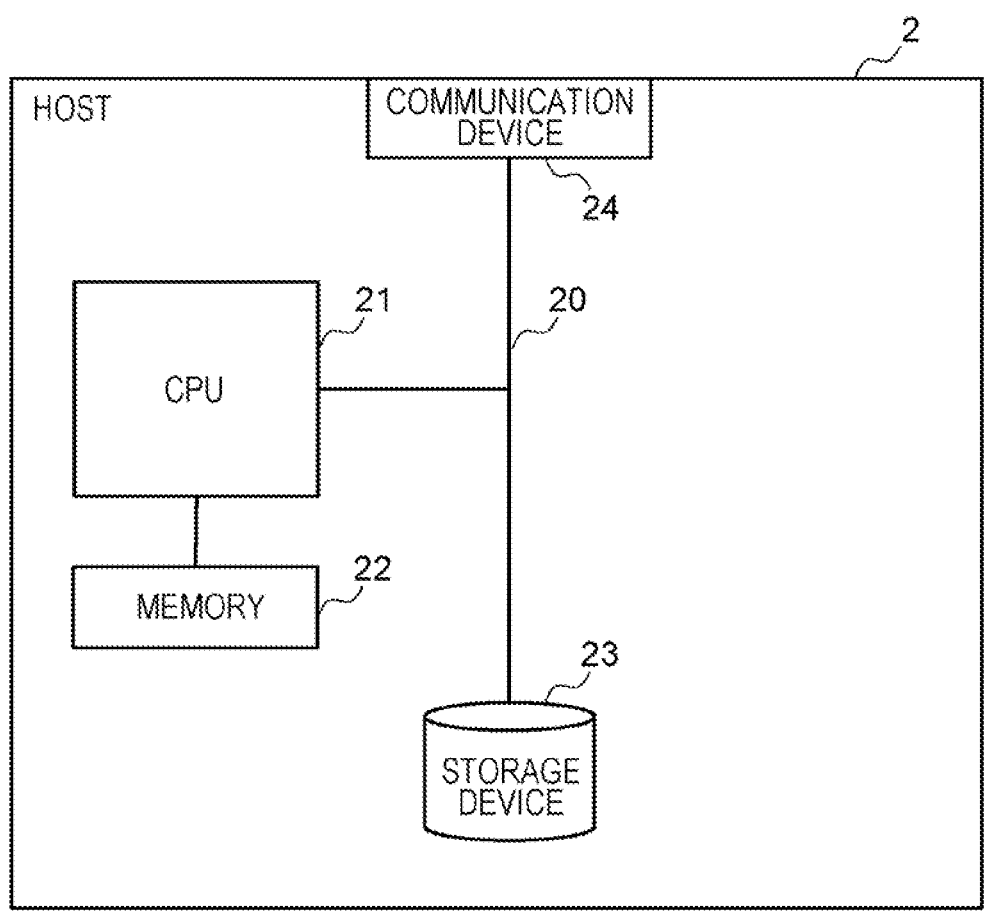
FIG. 2 is a block diagram illustrating a hardware configuration example of a host.
Figure 3:
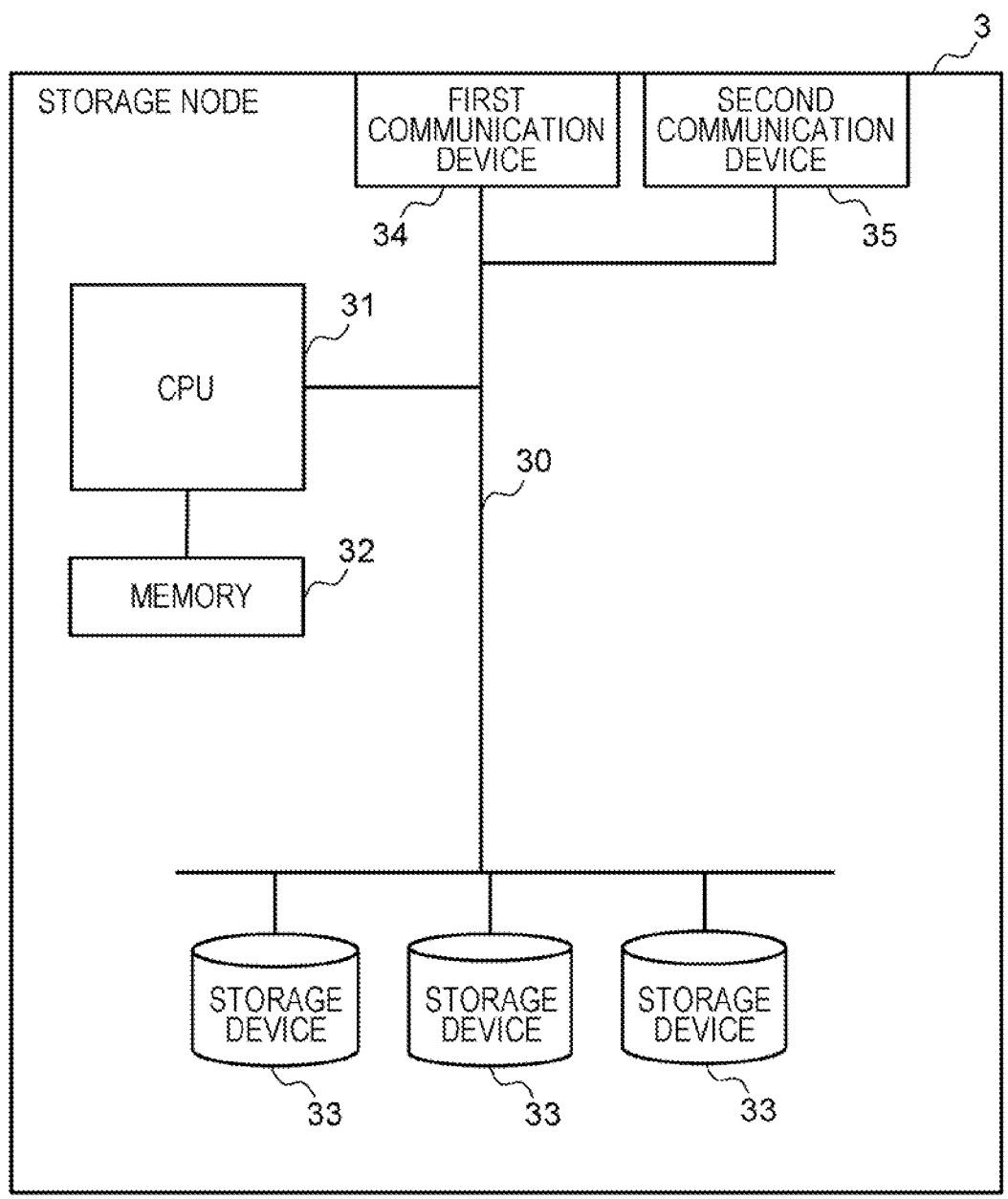
FIG. 3 is a block diagram illustrating a hardware configuration example of a storage node.

FIG. 1 is a block diagram illustrating an overall configuration example of an information processing system 1 according to a first embodiment of the present invention. The information processing system 1 illustrated in FIG. 1 includes a plurality of hosts 2 and a plurality of storage nodes 3. FIG. 2 is a block diagram illustrating a hardware configuration example of the host 2, and FIG. 3 is a block diagram illustrating a hardware configuration example of the storage node 3.

Each host 2 and each storage node 3 are connected via a storage service network 4 including, for example, fibre channel, Ethernet (registered trademark), InfiniBand, a wireless local area network (LAN), or the like, and each storage node 3 is connected via a backend network 5 including a LAN, Ethernet, InfiniBand, a wireless LAN, or the like.

Note that the storage service network 4 and the backend network 5 may be implemented by the same network, and each host 2 and each storage node 3 may be connected to a management network (not illustrated) other than the storage service network 4 and the backend network 5. Further, a management computer may be connected to the management network. In this case, a reference request or setting request from the host 2 to the storage node 3 may be made via the management network or the management computer. In addition, each of the storage service network 4 and the backend network 5 may be made redundant.

The host 2 is a physical computer device having a function of reading and writing data from and to the storage node 3 via the storage service network 4 in response to a user operation or a request from an implemented application program (hereinafter, referred to as an application). Note that the host 2 may be a virtual computer device such as a virtual machine (VM) or may have a configuration in which one or more virtual machines are constructed in the host 2.

As illustrated in FIG. 2, the host 2 includes one or more central processing units (CPUs) 21, one or more storage devices 23, and one or more communication devices 24 connected to one another via an internal network 20, and one or more memories 22 connected to the CPU 21.

The CPU 21 is a processor that controls the operation of the entire host 2. The memory 22 is implemented by a volatile semiconductor memory such as a static random access memory (SRAM) or a dynamic RAM (DRAM), or a nonvolatile semiconductor memory, and is used as a work memory of the CPU 21.

The storage device 23 is implemented by a large-capacity nonvolatile storage device such as a hard disk drive (HDD), a solid state drive (SSD), or a storage class memory (SCM), and is used to hold various programs, control data, and the like for a long period of time. The program stored in the storage device 23 is loaded into the memory 22 when the host 2 is started or when necessary, and the CPU 21 executes the program loaded into the memory 22 to perform various processing as the entire host 2 as described later.

The communication device 24 is an interface for the host 2 to communicate with the storage node 3 via the storage service network 4, and is implemented by, for example, a fibre channel card, an Ethernet card, an InfiniBand card, a wireless LAN card, or the like. The communication device 24 performs protocol control at the time of communication with the storage node 3 via the storage service network 4.

The storage node 3 is a physical general-purpose server device that provides a storage region for reading and writing data from and to the host 2. The storage node 3 may be a virtual machine. In addition, the storage node 3 and the host 2 may be co-located in the same physical node.

As illustrated in FIG. 3, the storage node 3 includes one or more CPUs 31, a plurality of storage devices 33, one or more first communication devices 34, and one or more second communication devices 35 connected to one another via an internal network 30, and one or more memories 32 connected to the CPU 31. Among these, the functions and configurations of the CPU 31 and the memory 32 are similar to those of the corresponding parts (the CPU 21 or the memory 22) of the host 2, and thus, a detailed description thereof will be omitted.

The storage device 33 is implemented by a large-capacity nonvolatile storage device such as an HDD, an SSD, or an SCM, and is connected to the second communication device 35 via an interface such as a nonvolatile memory express (NVMe), a serial attached small computer system interface (SCSI) (SAS), or a serial advanced technology attachment (serial ATA).

The first communication device 34 is an interface for the storage node 3 to communicate with the host 2 via the storage service network 4, and the second communication device 35 is an interface for the storage node 3 to communicate with another storage node 3 via the backend network 5. Since the first and second communication devices 34 and 35 have the same configuration as the communication device 24 of the host, a detailed description thereof will be omitted.

In the present embodiment, as illustrated in FIG. 1, each storage node 3 is collectively managed together with one or more other storage nodes 3 as a group called a cluster 6. In the example of FIG. 1, only one cluster 6 is set, but a plurality of clusters 6 may be provided in the information processing system 1. Each storage node 3 included in one cluster 6 is recognized as one storage device by the host 2.

Figure 4:
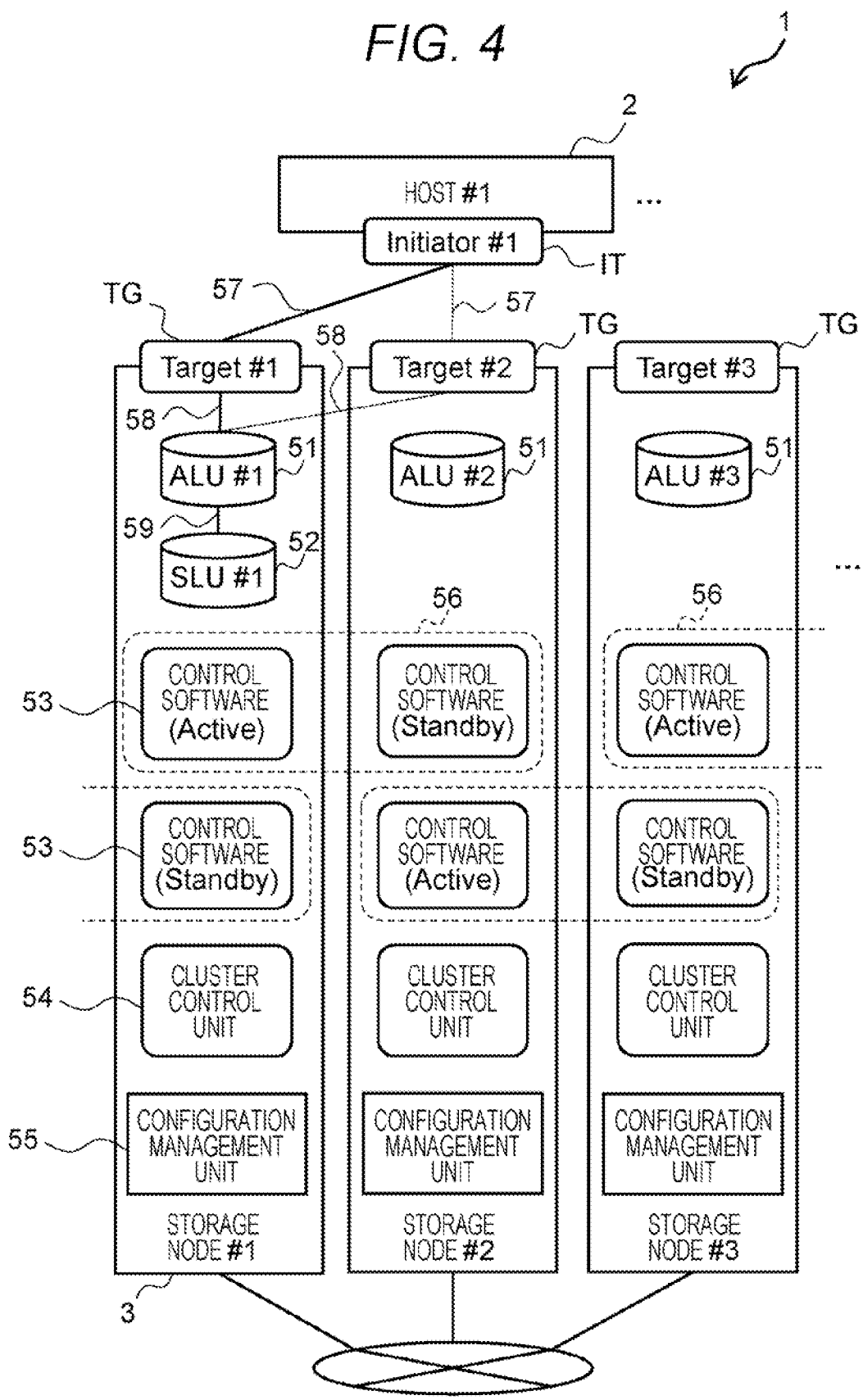
FIG. 4 is a block diagram illustrating a logical configuration example of the information processing system.

FIG. 4 is a block diagram illustrating a logical configuration example of the information processing system 1. The information processing system 1 includes one or more hosts 2 and a plurality of storage nodes 3 connected to each host 2.

As illustrated in FIG. 4, in the host 2, an initiator IT associated with a logical unit (a logical unit LU in FIG. 5 to be described later) created in the host 2 is defined. The initiator IT is associated with any port included in the host 2. Meanwhile, a target TG associated with each SLU created in a cluster (not illustrated) is defined in each storage node 3. The target TG is associated with any port included in the storage node 3.

Each storage node 3 includes an ALU 51, one or more SLUs 52, control software 53, a cluster control unit 54, and a configuration management unit 55 in addition to the target TG described above. A detailed mechanism of the ALU 51 and the SLU 52 will be described later with reference to FIG. 5. In the storage node 3, the ALU 51 serving as a reception port of an IO request from the host 2 and the SLU 52 serving as a processing target of the IO request received by the ALU 51 exist, and the host 2 can execute IO with respect to the corresponding SLU 52 only by recognizing the ALU 51. The cluster control unit 54 and the configuration management unit 55 will be described later with reference to FIG. 6.

The control software 53 is a storage controller (software) that manages a storage configuration and IO, and is configured to be redundant in an active-standby combination across the plurality of storage nodes 3 as illustrated in FIG. 4. The active control software 53 means that the control software 53 is set to an active system state (active mode) in which an IO request from the host 2 can be received, and the standby control software 53 means that the control software 53 is set to a standby system state (standby mode) in which an IO request from the host 2 is not received.

In addition, in the information processing system 1 according to the present embodiment, a redundancy group (storage controller group) 56 obtained by combining the active control software 53 and the standby control software 53 is configured to be connected in a row among the respective storage nodes 3. In FIG. 4, there is one active control software 53 and one standby control software 53 included in one redundancy group 56. However, in the present embodiment, one redundancy group 56 may include three or more control software 53 (more specifically, one active control software 53 and two or more standby control software 53).

As described above, the redundancy group (storage controller group) 56 including the plurality of control software 53 is connected in a row across the plurality of storage nodes 3, so that actual data stored in the SLU 52 is redundantly controlled by the control software 53 among the storage nodes 3.

In the present description, connection of the initiator IT, the target TG, and the ALU 51 is referred to as a path (for example, connections 57 and 58 in FIG. 4), and connection of the ALU 51 and the SLU 52 is referred to as binding (for example, connection 59 in FIG. 4). For example, in FIG. 4, a solid line indicates that a path is set from an initiator (initiator #1) of a host #1 to an ALU #1 via a target (target #1) of a storage node #1, and binding is set from the ALU #1 to an SLU #1 as connections when control software 53 of the storage node #1 is active. This connection relationship is a straight relationship since both the path from the target TG to the ALU 51 and the binding from the ALU 51 to the SLU 52 do not straddle the storage nodes 3.

Further, in FIG. 4, a broken line indicates that a path is set from the initiator #1 to the ALU #1 via a target #2, and binding is set from the ALU #1 to the SLU #1. This connection relationship schematically shows a path and binding used when the standby control software 53 (that is, control software 53 of a storage node #2) forming the redundancy group 56 together with the active control software 53 of the storage node #1 is promoted to active due to, for example, a failure occurring in the active control software 53.

Information of the ALU 51 and the SLU 52 in the storage node 3 is always shared by the control software 53 included in the storage node 3 and the control software 53 in the redundancy group 56. Although a detailed description is omitted, in a case where a failure occurs in the active control software 53 and the standby control software 53 is promoted to active, the storage node 3 in which the ALU 51 and the SLU 52 operate is also configured to appear to operate with the promoted control software 53. Therefore, specifically, referring to FIG. 4, the active control software 53 on the storage node #1 normally appears to operate on the storage node #1 while managing the ALU #1 and an SLU #2. Here, in a case where a failure occurs in the active control software 53 and the standby control software 53 on the storage node #2 is promoted to active, failover processing is performed in such a way as to migrate the ALU #1 and the SLU #1 to the storage node #2, and the ALU #1 and the SLU #2 appear to operate on the storage node #2. At this time, an IO request from the host #1 to the SLU #1 is made using the connection relationship indicated by the broken line illustrated in FIG. 4, and all of the target #2, the ALU #1, and the SLU #1 exist in the storage node #2. Therefore, the path and binding have a straight relationship.

As described above, the information processing system 1 can execute IO across the storage nodes 3 depending on setting of the path (connection between the initiator IT, the target TG, and the ALU) and the binding (connection between the ALU and the SLU).

Figure 5:
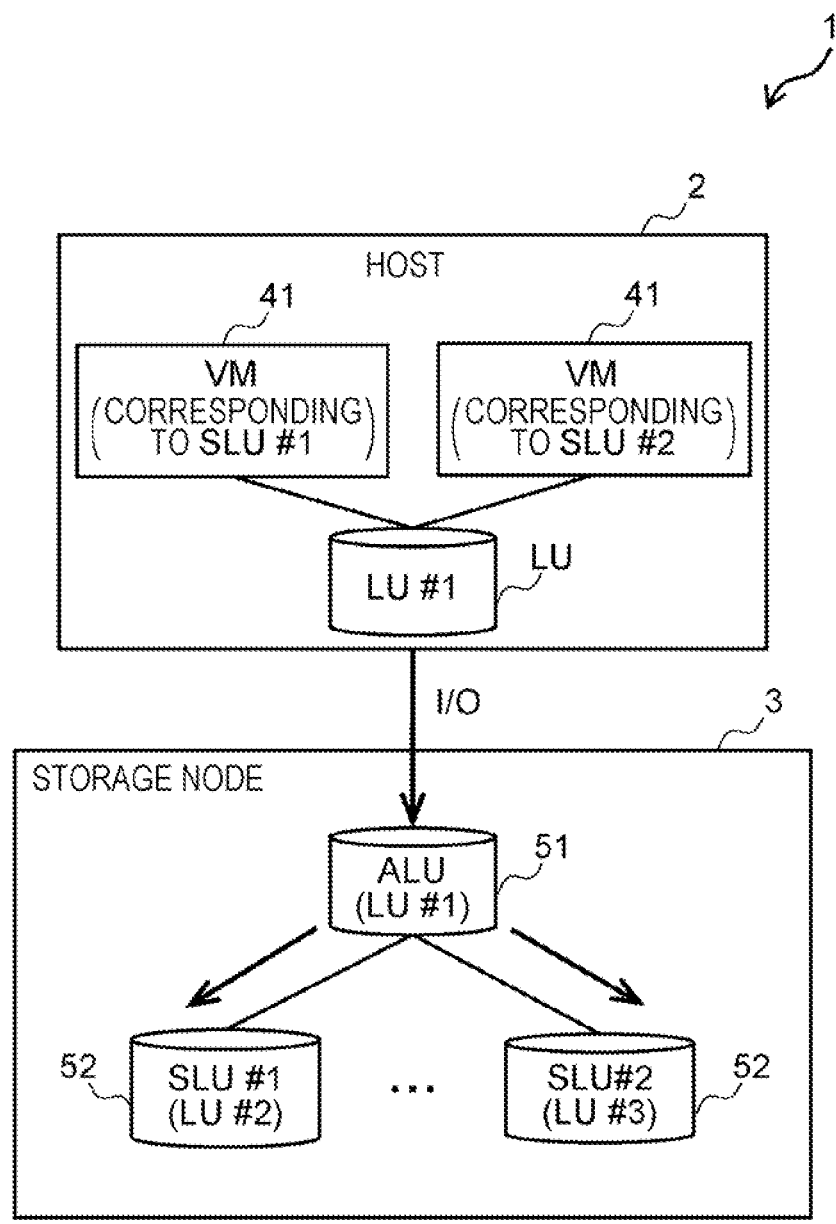
FIG. 5 is a diagram for describing a mechanism of an administrative logical unit (ALU) and a subsidiary logical unit (SLU) in the information processing system.

FIG. 5 is a diagram for describing a mechanism of the ALU and the SLU in the information processing system 1. For convenience of description, only one host 2 and one storage node 3 are illustrated in FIG. 5. However, as illustrated in FIG. 1, the actual information processing system 1 may include one or more hosts 2 and a plurality of storage nodes 3 connected to each host 2.

As described above, the ALU 51 and the SLU 52 used in the present embodiment are logical units (LUs) whose specifications are defined in a conglomerate LUN structure which is an SCSI architecture model. The SLU 52 provides a virtual logical volume (virtual volume) based on the storage device 33 that stores actual data, and the ALU 51 serves as an IO reception port for the SLU 52 bound with the ALU 51. That is, all the accesses from the host 2 to the SLU 52 are performed via the ALU 51, and the ALU 51 is a gateway that distributes IO to the bound SLU 52.

Specifically, as illustrated in FIG. 5, in the information processing system 1, one or more SLUs 52 (SLU #1, SLU

2, and the like) and the ALU 51 serving as a reception port of an IO request from the host 2 are created in the storage node 3. In the host 2, one or more virtual machines (VMs) 41 are constructed as a virtual computer corresponding to each SLU 52. The virtual volume provided by each SLU 52 of the storage node 3 is provided from the ALU 51 to the host 2 (VM 41) via the logical unit LU.

Each VM 41 transmits an IO request to the storage node 3 in response to a user operation or a request from an implemented application program (hereinafter, also referred to as an application). Here, in the information processing system 1 according to the present embodiment, in the storage node 3, a binding relationship between the ALU 51 and the SLU 52 is managed by an SLU management table 63 to be described later. Therefore, the host 2 (VM 41) may mount the ALU 51 without recognizing the SLU 52 when issuing an IO request. Then, the IO request transmitted from the host 2 (VM 41) to the ALU 51 is distributed to the appropriate SLU 52 in the ALU 51 by the configuration management unit 55, so that various requests such as read/write are transferred to the SLU 52 that is a processing target of the IO request.

Figure 6:
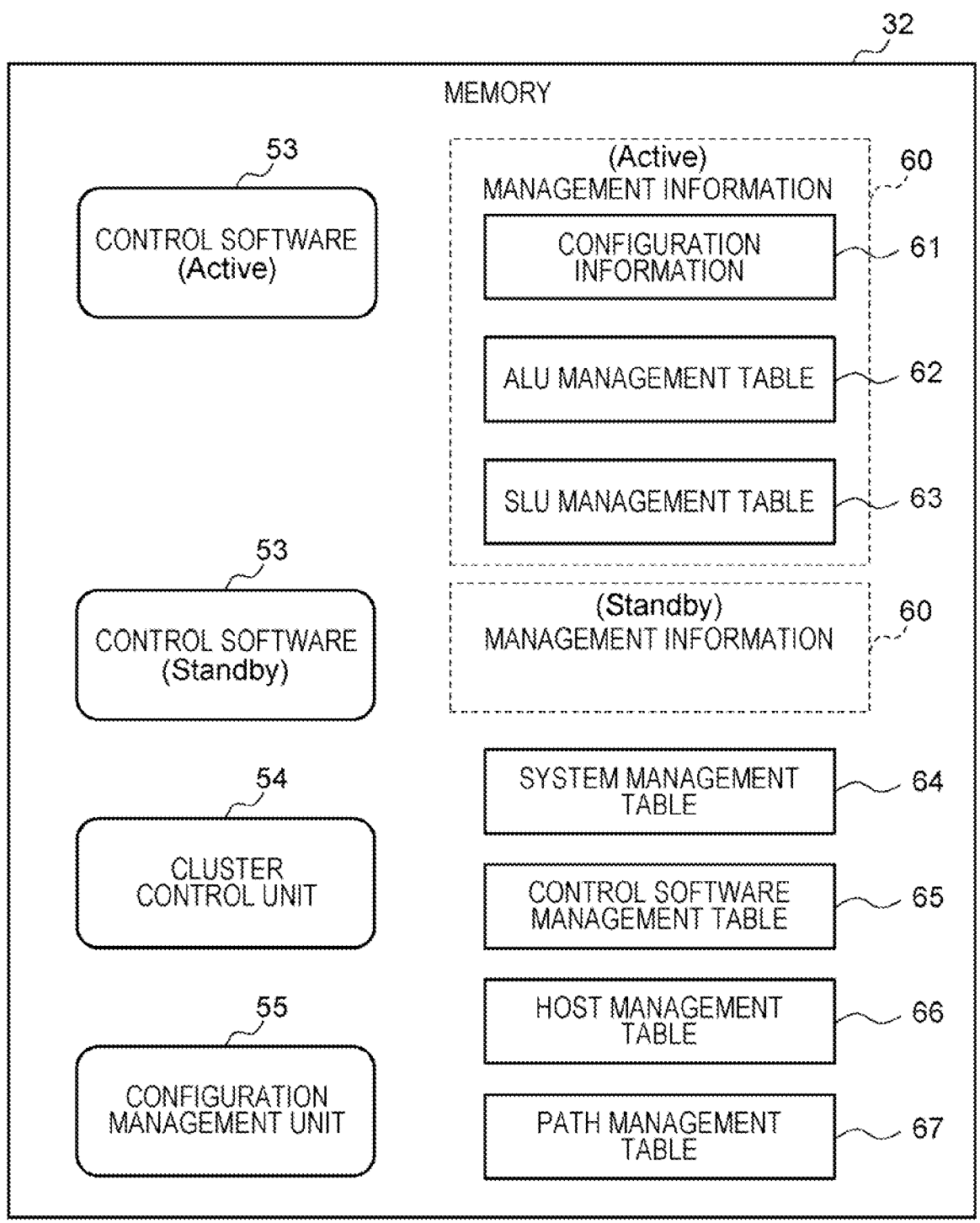
FIG. 6 is a block diagram illustrating a logical configuration example of a memory of the storage node.

FIG. 6 is a block diagram illustrating a logical configuration example of the memory 32 of the storage node 3. As illustrated in FIG. 6, the memory 32 of each storage node 3 stores a plurality of control software 53 (one control software 53 is active), the cluster control unit 54, the configuration management unit 55, management information 60 for each control software 53, a system management table 64, a control software management table 65, a host management table 66, and a path management table 67.

The control software 53 is software that receives a request from a compute node (the host 2 and the VM 41), performs IO processing, makes data redundant between the storage nodes 3, and stores the data in a drive (storage device 33).

The control software 53 manages the management information 60 for each active-standby redundancy group (storage controller group) 56 across the plurality of storage nodes 3, and stores the management information 60 in synchronization with management information 60 managed by the control software 53 of another storage node 3 belonging to the same redundancy group 56. In addition, as illustrated in FIG. 6, the management information 60 includes management information 60 of different types (active management information 60/standby management information 60) depending on whether the control software 53 in the storage node 3 is active or standby. That is, in FIG. 6, the active management information 60 and the standby management information 60 stored in the memory 32 of the same storage node 3 are different pieces of information (the included tables may have a common configuration). In the management information 60, information other than a logical-physical conversion table included in configuration information 61 may be synchronously stored not only in the control software 53 belonging to the same redundancy group 56 but also in all the storage nodes 3. However, in the present description, for convenience, a configuration example is illustrated in which the information is synchronously stored only in the redundancy group 56 having an active-standby relationship.

The management information 60 includes the configuration information 61, an ALU management table 62, and the SLU management table 63. Specifically, the configuration information 61 stores management information such as a logical-physical conversion table necessary for storage control such as thin provisioning, tier control, snapshot, compression, deduplication, or remote copy. Since a specific data example of the configuration information 61 is publicly known, a detailed description thereof will be omitted. The ALU management table 62 is management information of the ALU 51. In FIG. 9 described later, the ALU management table 62 will be described in detail with a specific example. The SLU management table 63 is management information of the SLU 52 and includes information on binding of the ALU 51 and the SLU 52. In FIG. 10 described later, the SLU management table 63 will be described in detail with a specific example.

The cluster control unit 54 is software that manages (for example, life monitoring, failover processing, and the like) the entire cluster. Since the cluster control unit 54 is similar to a program that implements a cluster control function in a known storage system, a detailed description thereof will be omitted.

The configuration management unit 55 is software that receive management operations of various operations in a storage system (information processing system 1), such as reference and setting change, and updates the management information. In the present embodiment, the configuration management unit 55 does not necessarily need to exist in the storage node 3, and may exist on the management computer described above, for example.

The system management table 64 indicates information of the entire information processing system 1, and is, for example, information for managing a resource of each storage node 3. In the system management table 64, information thereof is synchronized in all the storage nodes 3. In FIG. 7 described later, the system management table 64 will be described in detail with a specific example.

The control software management table 65 is management information of the control software 53 arranged in each storage node 3, and information thereof is synchronized in all the storage nodes 3. In FIG. 8 described later, the control software management table 65 will be described in detail with a specific example.

The host management table 66 is management information of the host 2, and information is synchronized in all the storage nodes 3. In FIG. 11 described later, the host management table 66 will be described in detail with a specific example.

The path management table 67 is path management information, and specifically, manages information indicating an IO path from the host 2 to the ALU 51 of the storage node 3. In the path management table 67, information thereof is synchronized in all the storage nodes 3. In FIG. 12 described later, the path management table 67 will be described in detail with a specific example.

(1-2) Data Configuration

FIG. 7 is a diagram illustrating an example of the system management table 64. The system management table 64 manages, for example, a resource of each storage node 3 as information of the entire information processing system 1.

The system management table 64 illustrated in FIG. 7 includes a node ID 641 indicating an identifier of the storage node 3 holding a management target resource (hereinafter, referred to as the resource), a resource type 642 indicating the type of the resource, a resource ID 643 indicating an identifier assigned to the resource, and a value 644 indicating a value of a predetermined item related to the resource. It is sufficient if the predetermined item indicated by the value 644 is determined in advance according to the type of the resource, and specifically, for example, in a case where the resource type 642 is a port, it is sufficient if a port number is held, and in a case where the resource type 642 is a drive, it is sufficient if a capacity of a drive is held.

FIG. 8 is a diagram illustrating an example of the control software management table 65. The control software management table 65 is management information of the control software 53 arranged in each storage node 3.

The control software management table 65 illustrated in FIG. 8 includes a storage controller ID 651, a state 652, an SCG ID 653, a node ID 654, a management capacity 655, and an available capacity 656.

The storage controller ID 651 indicates an identifier assigned to each control software 53 (in other words, each storage controller). The state 652 indicates a state of the control software 53 to be managed, and for example, not only an active state and a standby state but also a dead state indicating a state in which a failure has occurred or the like may be prepared. In addition, not only the standby state indicating a state in which the control software 53 is on standby but also a passive state indicating a state in which the control software 53 is in a waiting state or the like may be prepared, or another value may be provided.

The SCG ID 653 indicates a storage controller group ID to which the control software 53 to be managed belongs. The storage controller group ID is an identifier assigned to each redundancy group (storage controller group) 56 including a combination of the active control software 53 and the standby control software 53. The node ID 654 indicates an identifier of the storage node 3 in which the control software 53 to be managed is arranged. The management capacity 655 indicates a total value of capacities (pool) managed in units of the redundancy group (storage controller group) 56 to which the control software 53 to be managed belongs. The pool is used by allocating a storage region from a drive (storage device 33). The available capacity 656 indicates a capacity of a pool that can be created by the storage controller group to which the control software 53 to be managed belongs.

FIG. 9 is a diagram illustrating an example of the ALU management table 62. The ALU management table 62 is management information of the ALU 51 arranged in each storage node 3.

The ALU management table 62 illustrated in FIG. 9 includes an ALU ID 621 indicating an identifier assigned to the ALU 51 to be managed, a name 622 indicating a name of the ALU 51 to be managed, and an SCG ID 623 indicating an identifier of the redundancy group (storage controller group) 56 to which the control software 53 that controls the ALU 51 to be managed belongs.

FIG. 10 is a diagram illustrating an example of the SLU management table 63. The SLU management table 63 is management information of the SLU 52 arranged in each storage node 3.

The SLU management table 63 illustrated in FIG. 10 includes an SLU ID 631 indicating an identifier assigned to the SLU 52 to be managed, a name 632 indicating a name of the SLU 52 to be managed, a capacity 633 indicating a size of a logical volume provided by the SLU 52 to be managed, an SCG ID 634 indicating, with a storage controller group ID, to which redundancy group 56 the control software 53 that controls the SLU 52 to be managed belongs, and an ALU ID 635 indicating an ALU ID of the ALU 51 bound with the SLU 52 to be managed.

"N/A" in the ALU ID 635 means that no ALU 51 is bound with the SLU 52 to be managed. In the storage node 3, the SLU 52 and the ALU 51 can create a binding relationship of N:M (both are natural numbers), and thus a plurality of values (ALU IDs) may be set in the ALU ID 635.

FIG. 11 is a diagram illustrating an example of the host management table 66. The host management table 66 is management information of the host 2 connected as a higher-order device to the storage node 3.

The host management table 66 illustrated in FIG. 11 includes a host ID 661, a type 662, a maximum settable path number 663, and an initiator ID 664.

The host ID 661 indicates an identifier assigned to the host 2. The type 662 indicates the type of the target host. Specifically, arbitrary type information indicating the type of a physical machine, the type of a virtual machine, the type of a hypervisor, the type of an OS, or the like can be set. The maximum settable path number 663 indicates an upper limit of the number of paths (IO paths) that can be set from the target host 2 for one LU. The initiator ID 664 indicates an identifier assigned to the initiator IT (world wide name (WWN) of fibre channel, iSCSI qualified name (IQN), or the like) defined on the host 2 side.

FIG. 12 is a diagram illustrating an example of the path management table 67. The path management table 67 is path management information and indicates information on an IO path from the host 2 to the ALU 51 of the storage node 3.

The path management table 67 illustrated in FIG. 12 includes an ALU ID 671, a host ID 672, an initiator ID 673, a node ID 674, a target ID 675, and a priority flag 676.

The ALU ID 671, the initiator ID 673, and the target ID 675 indicate identifiers of the ALU 51, the initiator IT, and the target TG included in the target path, respectively. The identifier of the target TG indicated by the target ID 675 is an identifier of a port of the storage node 3 in which the target TG is defined, and a value corresponding to the resource ID 643 or the value 644 (only in a case of a unique value) of the port in the system management table 64 of FIG. 7 is set.

The host ID 672 indicates an identifier of the host 2 in which the initiator IT included in the target path is defined, and the node ID 674 indicates an identifier of the storage node 3 including the ALU 51 and the target TG included in the target path. In a case where a port ID of the initiator IT is registered in initiator ID 673 and the ID value is unique in world wide (WW) scale, the path management table 67 does not have to include the host ID 672. Similarly, in a case where a port ID of the target TG is recorded in the target ID 675 and the ID value is unique in the world wide (WW) scale, the path management table 67 does not have to include the node ID 674.

The priority flag 676 indicates information specifying a path that preferentially processes IO in a case where there are two or more paths (IO paths) connecting the ALU 51 indicated by the ALU ID 672 and the initiator IT indicated by the initiator ID 673. Specifically, a path in which "Yes" is registered in the priority flag 676 in FIG. 12 means a prioritized path that preferentially processes IO, and a path in which "No" is registered means a redundant path that does not preferentially process IO. The information of the priority flag 676 is also held on the host 2 side. More generally, the priority flag 676 indicates corresponding to "Preferred" of an asymmetric logical unit access (ALUA) function.

(1-3) Processing

Hereinafter, processing performed by the information processing system 1 having the above-described configuration will be described in detail.

Figure 13:
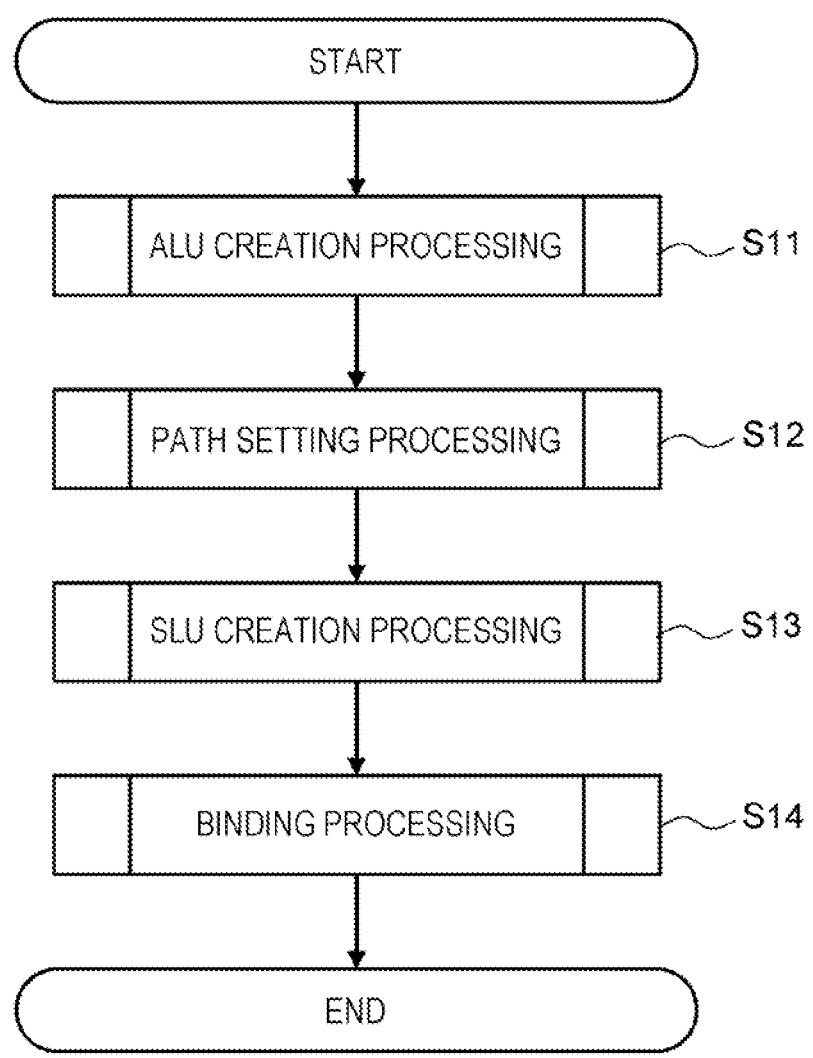
FIG. 13 is a flowchart illustrating a processing procedure example of processing of deploying a storage controller in the information processing system.
Figure 14:
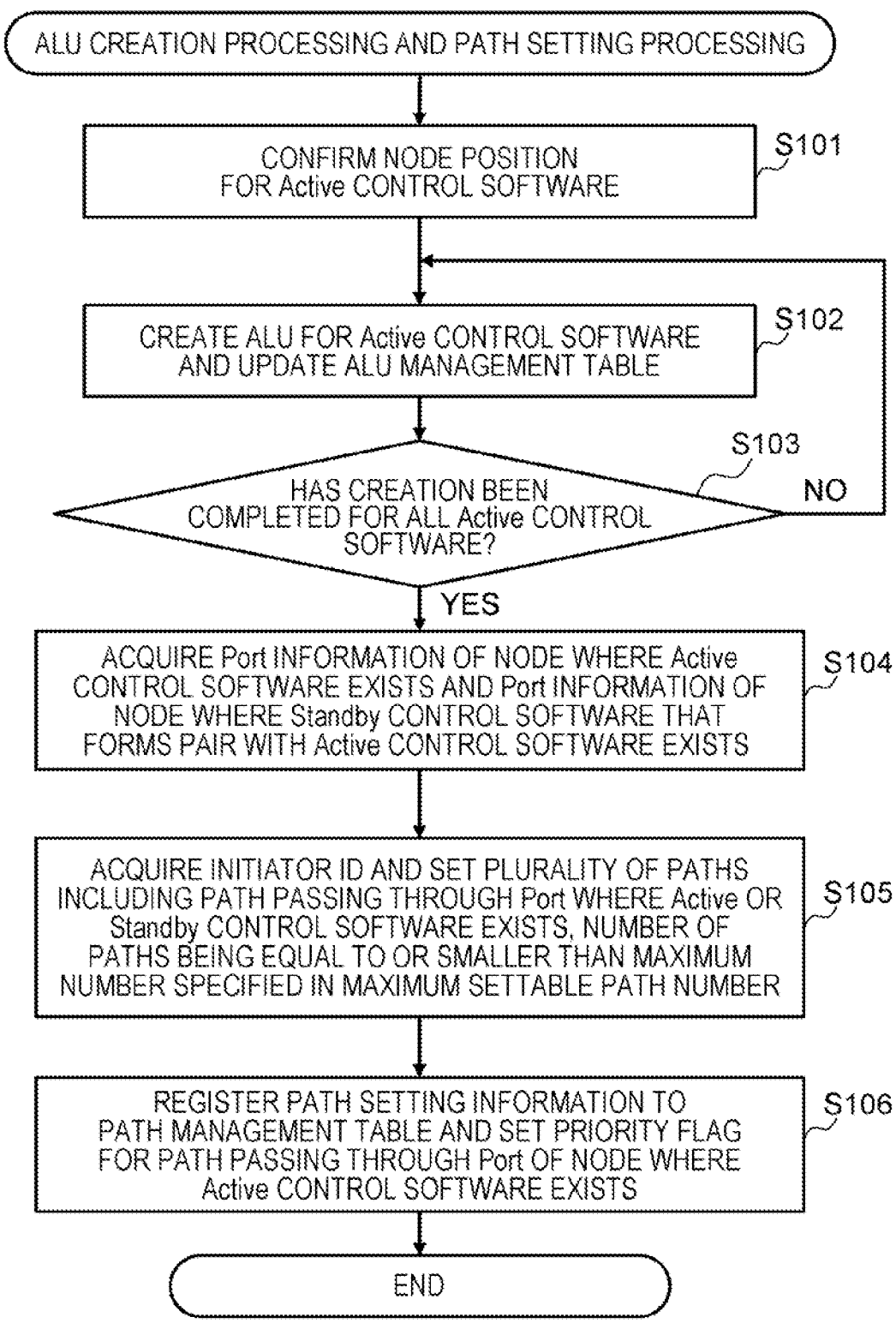
FIG. 14 is a flowchart illustrating a detailed processing procedure example of ALU creation processing and path setting processing.
Figure 15:
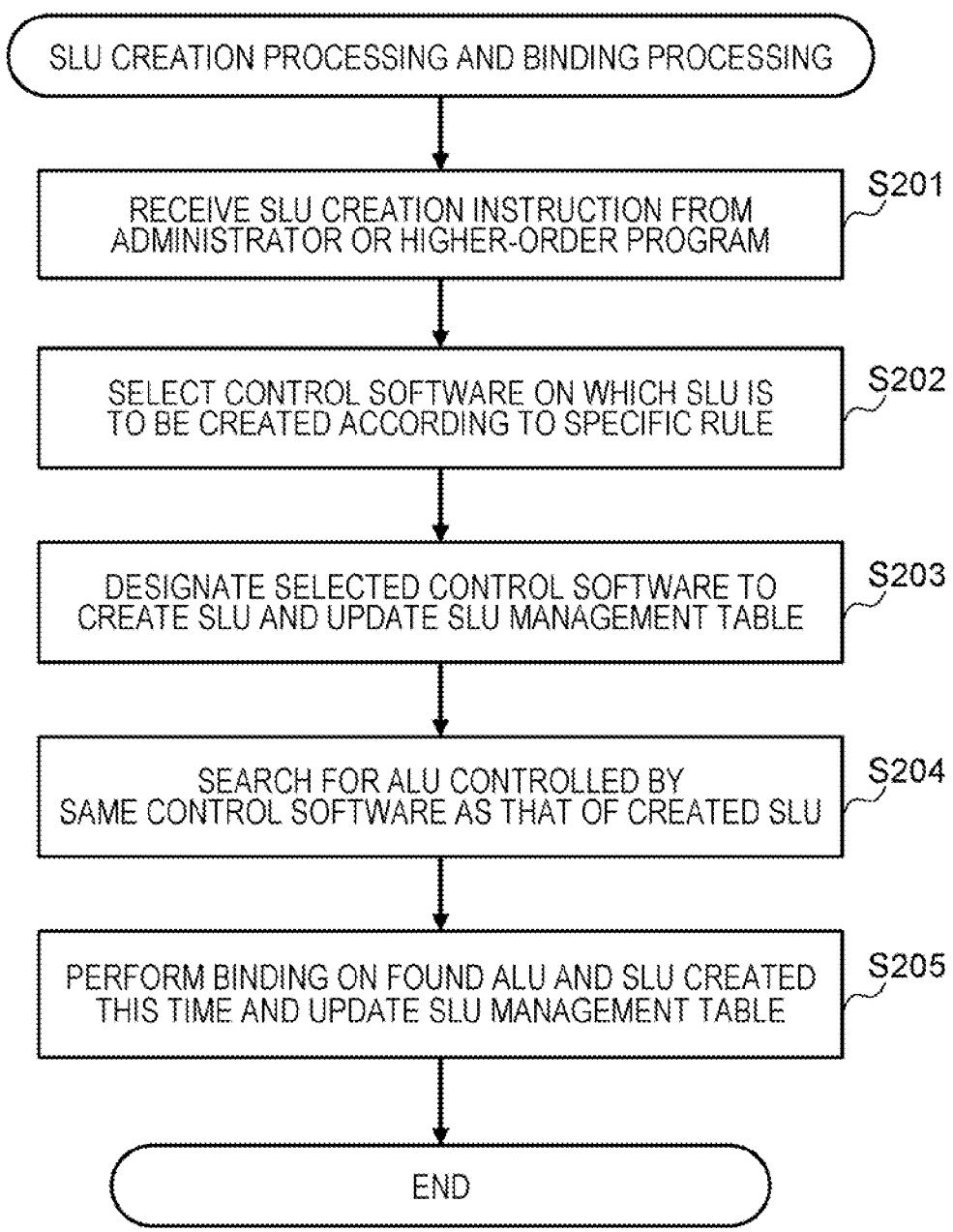
FIG. 15 is a flowchart illustrating a detailed processing procedure example of SLU creation processing and binding processing.

FIG. 13 is a flowchart illustrating a processing procedure example of processing of deploying the storage controller in the information processing system 1. FIG. 13 illustrates an outline of the processing, and a detailed processing procedure is illustrated in FIGS. 14 and 15 to be described later.

The processing illustrated in FIG. 13 is performed when the storage controller (control software 53) is deployed (arranged) in the information processing system 1, more specifically, when the active control software 53 constructs the combination of the ALU 51 and the SLU 52 for the first time in the information processing system 1 (initial construction), or when the configuration of the combination of the ALU 51 and the SLU 52 is changed due to an addition of a storage node 3 (an addition of a node). The information of the system management table 64 and the control software management table 65 is set based on the device configuration of the information processing system 1 before the processing of FIG. 13 is started. In addition, it is assumed that the information of the host management table 66 is also set in advance by an administrator or the like before the processing of FIG. 13 is started.

Referring to FIG. 13, the configuration management unit 55 first performs ALU creation processing for creating the ALU 51 (Step S11).

Next, the configuration management unit 55 performs path setting processing of setting a path from the host 2 to the ALU 51 created in Step S11 in such a way as to include a port where the active or standby control software 53 exists (Step S12).

Next, the configuration management unit 55 performs SLU creation processing for creating the SLU 52 in response to a request from the administrator or a higher-order program of the host 2 (Step S13).

Next, the configuration management unit 55 performs binding processing of binding the ALU 51 created in Step S11 and the SLU 52 created in Step S13 (Step S14), and ends the entire processing.

FIG. 14 is a flowchart illustrating a detailed processing procedure example of the ALU creation processing and the path setting processing. The processing illustrated in FIG. 14 corresponds to the ALU creation processing of Step S11 and the path setting processing of Step S12 in FIG. 13, and is specifically called and performed, for example, at the time of constructing a cluster environment, at the time of adding a storage node 3, at the time of activating the function of the ALU or the SLU (at the time of setting a license for activating the function), or the like.

Referring to FIG. 14, first, the configuration management unit 55 confirms the position of the storage node 3 where the active control software 53 exists by referring to the control software management table 65 (Step S101). Hereinafter, the control software 53 in the active state may be referred to as "active control software", and the control software 53 in the standby state may be referred to as "standby control software".

Next, the configuration management unit 55 instructs the active control software to create the ALU 51, and updates the ALU management table 62 for the created ALU 51 (Step S102). The configuration management unit 55 performs the processing of Step S102 on all the active control software 53 confirmed in Step S101.

Next, the configuration management unit 55 confirms whether or not the creation of the ALU 51 has been completed for all the active control software 53 confirmed in Step S101 (Step S103), and in a case where there remains control software 53 on which the creation of the ALU 51 has not been completed (NO in Step S103), the processing returns to Step S102, and the creation of the ALU 51 is repeated. On the other hand, in a case where the creation of the ALU 51 has been completed for all the active control software (YES in Step S103), the processing proceeds to Step S104.

As described above, the processings from Step S101 to Step S103 (YES in Step S103) correspond to the ALU creation processing (Step S11 in FIG. 13), and the processings from Step S104 correspond to the path setting processing (Step S12 in FIG. 13).

In Step S104, the configuration management unit 55 acquires, by referring to the control software management table 65 and the system management table 64, port information of the storage node 3 where the active control software exists (information associated with "port" in the resource type 642) and port information of the storage node 3 where the standby control software that forms a pair with the active control software exists.

Next, the configuration management unit 55 acquires, by referring to the host management table 66, the initiator ID 664 of the host 2, and sets a plurality of paths from the target TG to the ALU 51 created in Step S102, the paths including a path passing through a port (target TG) where the active control software exists and a path passing through a port (target TG) where the standby control software that forms a pair with the active control software exists (Step S105).

More specifically, in a case of the configuration of FIG. 4, for example, when the active control software 53 existing in the storage node #1 and the standby control software 53 existing in the storage node #2 form the same redundancy group (storage controller group) 56, in Step S105, at least a path from the initiator #1 to the ALU 51 of the storage node #1 created by the active control software via the target #1 of the storage node #1 (an active path indicated by a solid line in FIG. 4) and a path from the initiator #1 to the ALU 51 via the target #2 of the storage node #2 (an active path indicated by a broken line in FIG. 4) are set. In Step S105, the configuration management unit 55 sets, in addition to the active path and the standby path described above, a path from the target TG that has acquired the initiator ID to the ALU 51 created in Step S102 as many as a number equal to or less than the upper limit specified in the maximum settable path number 663 of the host management table 66.

Next, for each path set in Step S105, the configuration management unit 55 registers information indicating the path in the path management table 67 (Step S106). At this time, the configuration management unit 55 sets, as the prioritized path, a path passing through the port of the storage node 3 where the active control software exists (the above-described active path) by setting the priority flag 676 corresponding to the path to "Yes", and sets, as the redundant path, a path passing through the port of the storage node 3 where the standby control software exists (the above-described standby path) by setting the priority flag 676 corresponding to the path to "No". Then, the configuration management unit 55 transmits the registered information of the path management table 67 to the host 2, and ends the path setting processing.

Among the processings in FIG. 14 described above, the path setting processing (Steps S104 to S106) only needs to be performed before the binding processing (Steps S204 to S205 in FIG. 15), and does not necessarily need to be continuously called after the completion of the ALU creation processing (Steps S101 to S103). For example, the path setting processing may be called as a trigger when the host management table 66 is updated in response to a request from the administrator or the higher-order program of the host 2 after completion of the ALU creation processing.

In addition, the number of ALUs 51 created in Step S102 may be one or more. In a third embodiment to be described later, processing of designating the number of ALUs at the time of adding a node will be described.

FIG. 15 is a flowchart illustrating a detailed processing procedure example of the SLU creation processing and the binding processing. The processing illustrated in FIG. 15 corresponds to the SLU creation processing of Step S13 and the binding processing of Step S14 in FIG. 13, and specifically, for example, is called and performed at a timing when the creation of the SLU is instructed from the administrator or the higher-order program of the host 2.

Referring to FIG. 15, first, the configuration management unit 55 receives an SLU creation request from the administrator or the higher-order program of the host 2 (Step S201).

Next, the configuration management unit 55 selects the control software 53 on which the SLU 52 is to be created according to a specific rule (for example, a capacity determined for each control software 53 (or redundancy group) 56 or the number of SLUs 52) (Step S202). As for the specific rule in Step S202, specifically, for example, a rule such as preferentially selecting the control software 53 having the largest available capacity that enables creation of a volume or selecting the control software 53 on which the number of created SLUs 52 is smallest is adopted. The specific rule may be set in advance by the administrator or the higher-order program of the host 2, or may be designated at the start of the SLU creation processing or the like.

Next, the configuration management unit 55 creates the SLU 52 by designating the control software 53 selected in Step S202, and updates the SLU management table 63 with information regarding the created SLU 52 (Step S203).

As described above, the processings from Step S201 to Step S203 correspond to the SLU creation processing (Step S13 in FIG. 13), and the processings from Step S204 correspond to the binding processing (Step S14 in FIG. 13).

In the binding processing, first, the configuration management unit 55 searches for the ALU 52 created by the same control software 53 as that of the SLU 51 created in Step S203 (in other words, the ALU 51 controlled by the same control software 53) by referring to the ALU management table 62 (Step S204). In a case where a plurality of ALUs 51 are found, for example, the ALU 52 having the smallest number of bound SLUs 51 may be selected as the ALU 51 to be found. In addition, load information of each ALU 51 in the same control software 53 may be collected, and the ALU 51 with a small load may be selected as the ALU to be found.

Next, the configuration management unit 55 performs binding on the ALU 51 found in Step S204 and the SLU 52 created in Step S203, updates the SLU management table 63 with information on the binding (Step S205), and ends the binding processing.

Among the processings in FIG. 15 described above, the binding processing (Steps S204 to S205) does not necessarily need to be continuously called after the completion of the SLU creation processing (Steps S201 to S203), and for example, may be called as a trigger when binding is instructed by the administrator or the higher-order program of the host 2 (at the time of activation of the virtual machine 41 or the like).

As described above, by performing the processings illustrated in FIGS. 13 to 15, the information processing system 1 according to the present embodiment creates at least one ALU 51 in units of a storage controller implemented by a combination of the active control software 53 and the standby control software 53 across the storage nodes 3 at the time of deployment of the storage controller (at the time of the initial construction and the addition of a node). With the information processing system 1 configured as described above, it is possible to implement redundancy of data control and suppress deterioration of IO performance and reliability during system operation.

In addition, in the information processing system 1 according to the present embodiment, by performing the processings illustrated in FIGS. 13 to 15, in the storage node 3 (storage node #1) in which the active control software 53 exists, both the path between the target TG and the ALU 51 and the binding between the ALU 51 and the SLU 52 can be set in a straight relationship in which the path and the binding do not straddle other storage nodes 3. Further, also in the storage node 3 (storage node #2) in which the standby control software 53 that forms a pair with the active control software 53 exists, a path to the ALU 51 is set via a port (target TG) of the node. By setting the standby path, in a case where a failure occurs in the storage node #1, the standby control software of the storage node #2 is promoted to active, and the ALU 51 and the SLU 52 of the storage node #1 are migrated to the storage node #2 by failover, both the path and the binding have a straight relationship in the storage node #2.

That is, with the information processing system 1 according to the present embodiment, it is possible to implement redundancy of data control by implementing the storage controller with a combination of the active control software 53 and the standby control software 53, and it is possible not only to obtain high IO performance and reliability by the straight configuration of the path and binding in the storage node #1 in a case of normal configuration, but also to maintain high IO performance and reliability since the path and binding have the straight configuration in the storage node #2 after the configuration change such as failover due to occurrence of a failure.

(2) Second Embodiment

An information processing system 1 according to a second embodiment will be described focusing on a difference from the first embodiment. A configuration and processing common to those of the first embodiment will not be described repeatedly.

The information processing system 1 according to the second embodiment performs, in a different processing procedure, the SLU creation processing among the four main processings (the ALU creation processing, the path setting processing, the SLU creation processing, and the binding processing) constituting the overall processing illustrated in FIG. 13 in the first embodiment. Although details will be described later, in the SLU creation processing according to the second embodiment, when newly creating an SLU, the new SLU is to be created in the same storage controller group as that of an already created SLU in a case where the purpose of use of the new SLU is the same as that of the already created SLU. In addition, in the second embodiment, in a case where an SLU cannot be created in the same storage controller group as that of the created SLU due to the problem of the available capacity at the time of creating a new SLU, among the created SLUs, an SLU that can be migrated to another storage node 3 is migrated to increase the available capacity, and then a new SLU is created.

In order to implement such a second embodiment, the information processing system 1 of the present embodiment stores an SLU management table 71 having a data configuration different from that of the first embodiment in a memory 32 of a storage node 3, and performs the SLU creation processing in a processing procedure different from that of the first embodiment.

FIG. 16 is a diagram illustrating an example of the SLU management table 71 according to the second embodiment. In the SLU management table 71 of FIG. 16, a difference from the SLU management table 63 illustrated in FIG. 10 in the first embodiment is that an APP ID 716 is added, and information indicated by each of other data items (an SLU ID 711, a name 712, a capacity 713, an SCG ID 714, and an ALU ID 715) is similar to the information indicated by the data item having the same name in the SLU management table 63, and thus a detailed description thereof will be omitted.

The APP ID 716 is an identifier indicating in which application (for example, a VM 41 of a host 2) an SLU 52 to be managed is used, and indicates an identifier (application ID) assigned to each application. In other words, the APP ID 716 is information for designating an application that accesses the SLU 52 to be managed and operates. Information to be registered in the APP ID 716 is given from the administrator or the higher-order program of the host 2 when the SLU 52 is created. In the SLU management table 71 of FIG. 16, the purpose of use of the SLU 52 is identified using the application ID. However, the SLU management table 71 of the present embodiment is only required to hold information indicating the purpose of use of the SLU 52, and may hold information indicating the purpose of use in another format (for example, a log of a database) instead of the application ID.

Figure 17:
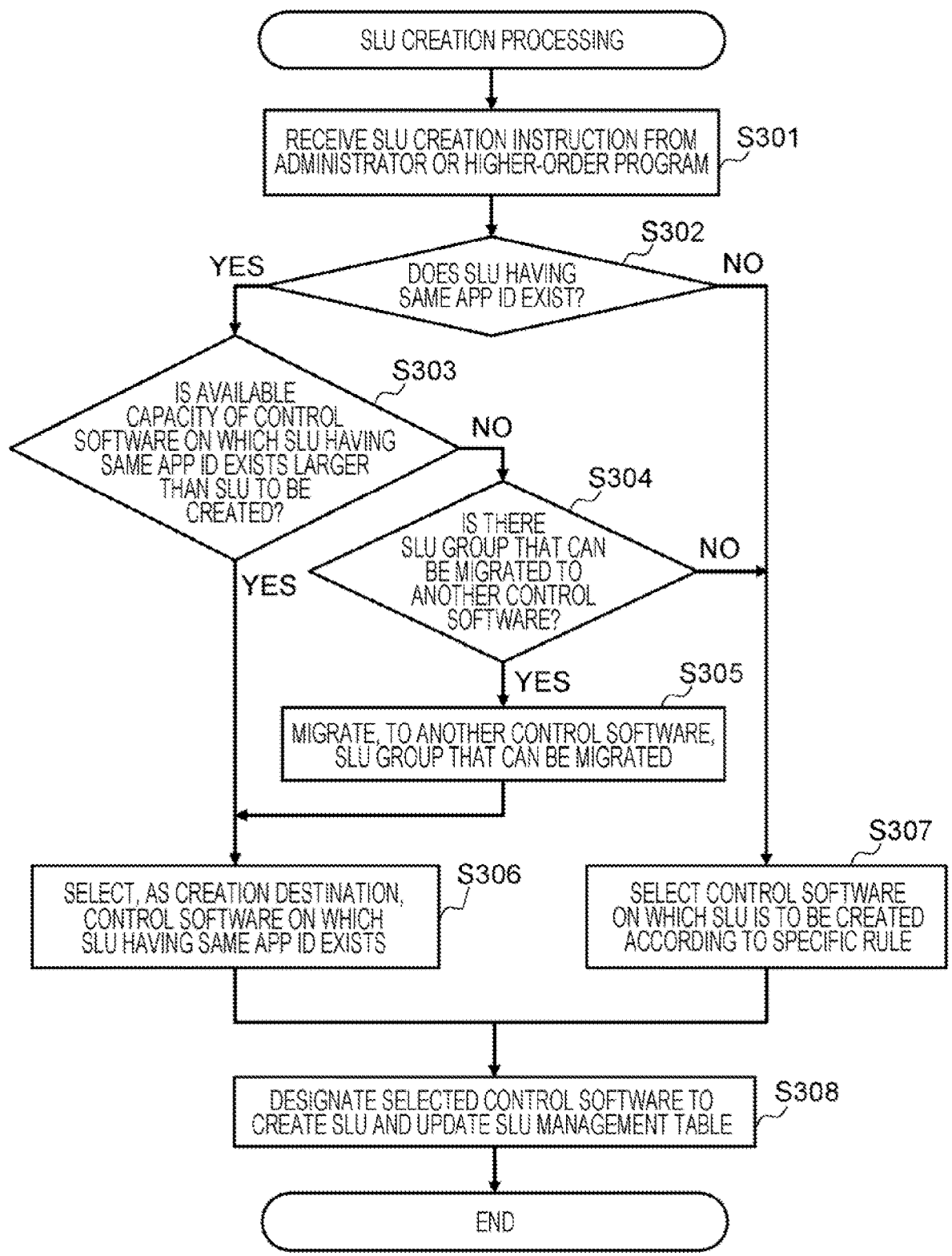
FIG. 17 is a flowchart illustrating a processing procedure example of SLU creation processing according to the second embodiment.

FIG. 17 is a flowchart illustrating a processing procedure example of the SLU creation processing according to the second embodiment. Similarly to the SLU creation processing in the first embodiment, the SLU creation processing illustrated in FIG. 17 is performed by a configuration management unit 55.

Referring to FIG. 17, first, the configuration management unit 55 receives a request for creating the SLU 52 from an administrator or a higher-order program of the host 2 (Step S301). In this SLU creation request, an application ID of an application that uses the SLU 52 to be created and a capacity of the SLU are designated. Hereinafter, the SLU 52 requested to be created in Step S301 is referred to as a new SLU.

Next, the configuration management unit 55 determines whether or not the SLU 52 having the same purpose of use as that of the new SLU has been created by referring to the SLU management table 71 (Step S302). Hereinafter, the created SLU 52 is referred to as an existing SLU. Specifically, the configuration management unit 55 determines whether or not there is an existing SLU on which an application ID corresponding to an application that uses the new SLU is registered in the APP ID 716 of the SLU management table 71. For example, in the SLU management table 71 of FIG. 16, in a case where the new SLU is used in an application with an application ID "1", an SLU #1 and an SLU #2 among SLUs #1 to #3 which are the existing SLUs correspond to the existing SLUs having the same purpose of use as the new SLU since the application ID "1" is registered in the APP ID 716.

In Step S302, in a case where there is an existing SLU having the same purpose of use (application ID) as the new SLU (YES in Step S302), the processing proceeds to Step S303, and in a case where there is no existing SLU having the same purpose of use (application ID) (NO in Step S302), the processing proceeds to Step S307.

In Step S303, the configuration management unit 55 determines whether or not the available capacity for volume creation in the control software 53 that controls the existing SLU having the same purpose of use (application ID) as the new SLU is larger than a capacity required for the new SLU. In a case where an affirmative result is obtained (YES in Step S303), the processing proceeds to Step S306, and in a case where a negative result is obtained (NO in Step S303), the processing proceeds to Step S304.

In a case where a negative result is obtained in Step S303, the configuration management unit 55 determines whether or not there is an SLU group (meaning one or more SLUs) that can be migrated to another storage node 3 (to be under the control of another control software 53) in the storage node 3 in which an existing SLU having the same purpose of use exists (Step S304).

More specifically, the processing of Step S304 may be performed as follows. First, the configuration management unit 55 searches for an existing SLU that satisfies the condition that the ALU ID 715 is empty (N/A) (in other words, unbound) and the APP ID 716 is a common application ID (it is not necessary to be the same application ID as the new SLU) by referring to the SLU management table 71, thereby specifying a migratable SLU group. Next, the configuration management unit 55 compares the total capacity of the migratable SLU group specified in the previous search with the available capacity of each of other control software 53 by referring to the control software management table 65. Then, in a case where there is "another control software 53" whose available capacity is larger than the total capacity of the migratable SLU group, the configuration management unit 55 determines in Step S304 that there is an SLU group that can be migrated to be under the control of the "another control software 53".

Then, in a case where there is an SLU group that can be migrated to be under the control of another control software 53 in Step S304 (YES in Step S304), the configuration management unit 55 migrates the SLU group in such a way that the SLU group is under the control of another control software 53 (Step S305). By the processing of Step S305, an available capacity required for the new SLU is secured in the control software 53 on which the SLU group existed before the migration, and thus the processing proceeds to Step S306. On the other hand, in a case where there is no SLU group that can be migrated to be under the control of another control software 53 in Step S304 (NO in Step S304), the processing proceeds to Step S307.

The processing of Step S306 is performed in a case where there is an existing SLU having the same purpose of use as the new SLU and the control software 53 that controls the existing SLU has the available capacity required for creating the new SLU. At this time, the configuration management unit 55 selects, as a creation destination of the new SLU, the control software 53 described above, that is, the control software 53 that controls an existing SLU having the same purpose of use as the new SLU (for example, the control software 53 as a migration source of the SLU group in a case where the processing of Step S306 is performed through Step S305) (Step S306).

On the other hand, the processing of Step S307 is performed in a case where there is no existing SLU having the same purpose of use as the new SLU, or in a case where there is an existing SLU having the same purpose of use as the new SLU, but the control software 53 that controls the existing SLU cannot secure an available capacity required for creating the new SLU. At this time, the configuration management unit 55 selects another control software 53 as a creation destination of the new SLU according to a specific rule (for example, the capacity determined for each control software 53 or the number of SLUs 52) (Step S307). The processing of selecting the control software 53 as the creation destination in Step S307 is similar to the processing of Step S202 in FIG. 15.

Then, the configuration management unit 55 designates the control software 53 selected in Step S306 or Step S307 to create a new SLU, and updates the SLU management table 63 with information regarding the created SLU 52 (Step S308). With the above, the SLU creation processing ends.

In Step S307, in a case where a new SLU cannot be created by the control software 53 that controls an existing SLU having the same purpose of use as the new SLU, a creation destination of the new SLU is selected from other control software 53 according to a specific rule. However, as a modification, a warning may be returned and the above processing may be performed, or an error may be returned and the SLU creation processing may be stopped.

Furthermore, the processings of Steps S304 and S305 do not have to necessarily be performed in a series of processing in the SLU creation processing of FIG. 17. This is because the processings of Steps S304 and S305 require a relatively long processing time, and the configuration management unit 55 may periodically perform these processings without synchronizing with the SLU creation processing.

As described above with reference to FIG. 17, the SLU creation processing according to the second embodiment is different from the SLU creation processing illustrated in FIG. 15 according to the first embodiment in that, in the selection of the control software 53 as a creation destination at the time of creating an SLU, the control software 53 that controls an existing SLU having the same purpose of use (application ID) as the new SLU to be created is preferentially selected, and in a case where the available capacity in the control software 53 is insufficient, the existing SLU having the same purpose of use is migrated to another control software 53, and then the new SLU is created by the control software 53.

According to the second embodiment, a plurality of SLUs 52 having the same purpose of use (application ID), in other words, a plurality of SLUs 52 constituting the same application can be arranged to be under the control of the same control software 53 in a single redundancy group 56 (more specifically, a single storage node 3) as much as possible.

Here, in a known virtual volume provision function, there may be a plurality of SLUs included in one VM 41 (different types of virtual volumes exist). In a case where the plurality of SLUs are distributed to a plurality of storage nodes 3, there is a disadvantage in IO access performance and availability. Therefore, it is preferable that the plurality of SLUs are aggregated in the same node as much as possible. Examples of the disadvantage in availability include an increase in probability that, in a case where SLUs included in one VM 41 are distributed to a plurality of storage nodes 3, a node failure occurs in the SLUs included in one VM 41 according as the distribution to the nodes is made.

Therefore, in the second embodiment, by performing the above-described SLU creation processing, a plurality of SLUs 52 having the same purpose of use (application ID), that is, a plurality of SLUs 52 used by the same VM 41 are configured to be controlled by the same control software 53 in one storage node 3. Therefore, it is possible to obtain an effect of suppressing deterioration in IO access performance and availability in addition to the effect obtained by the first embodiment.

(3) Third Embodiment

An information processing system 1 according to a third embodiment will be described focusing on a difference from the first embodiment. A configuration and processing common to those of the first embodiment will not be described repeatedly.

The information processing system 1 according to the third embodiment considers a removal of a storage node 3, and performs, in a different processing procedure, the SLU creation processing and the binding processing among the four main processings (the ALU creation processing, the path setting processing, the SLU creation processing, and the binding processing) constituting the overall processing illustrated in FIG. 13 in the first embodiment.

In general, when removing a storage node (hereinafter, abbreviated as a node) from a cluster in a storage system, the node is removed after migrating a resource existing in the node to be removed to another node. Similarly, in a case of removing a node in the information processing system 1 according to the first embodiment, the ALU and the SLU allocated to the active control software are migrated to another control software, and then the node where the active control software existed is removed from the cluster. Here, in the first embodiment, the path and the binding have a straight relationship in the node where the active control software exists, and in a case of migrating the ALU and the SLU without stopping IO in this state, the ALU and the SLU are migrated to another control software without changing setting of the binding between the ALU and the SLU. However, in a case where the number of ALUs created in the node is small (for example, one), when migrating the ALU and the SLU to another control software while maintaining the binding relationship between the ALU and the SLU, a cluster of the ALU and the SLU is very large, and thus, the capacity of specific control software is excessively consumed. As a result, a problem that the efficiency in distribution to another control software deteriorates may occur. Therefore, in order to solve the above problem, in the third embodiment, the number of ALUs 51 in the storage node 3 can be changed (mainly increased) during system operation by performing the SLU creation processing and the binding processing according to the present embodiment when removing a storage node 3.

In the third embodiment, a method of changing the number of ALUs 51 during system operation includes a method of changing the number of ALUs 51 at the time of SLU creation (first change method), a method of changing the number of ALUs 51 at the time of binding setting (second change method), and a method of changing the number of ALUs 51 at the time of adding a node (third change method). Hereinafter, the first to third change methods will be described. In the following description, a case of adding an ALU 51 will be described. However, a case of removing an ALU 51 may be similarly considered.

(3-1) First Change Method

Figure 18:
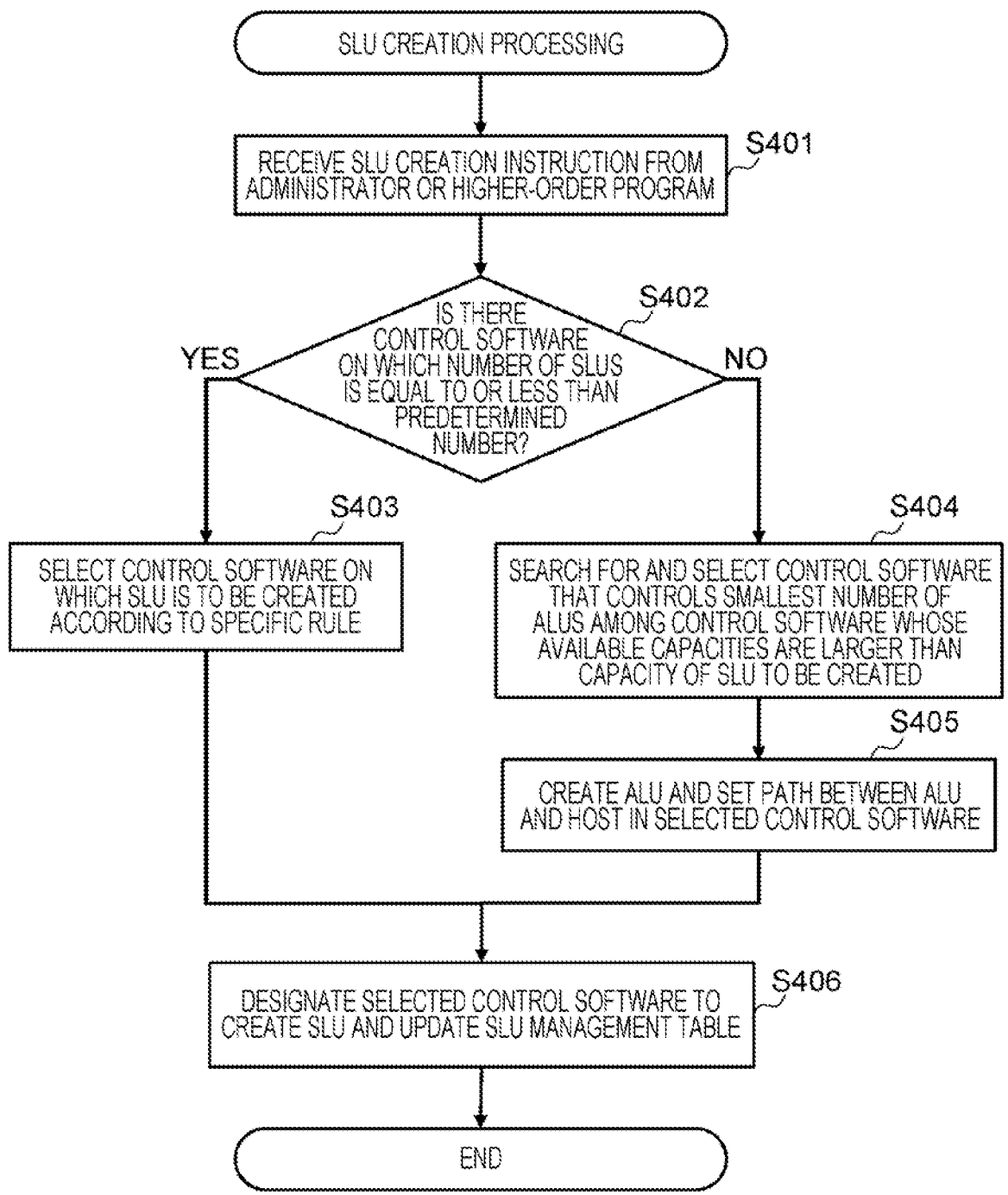
FIG. 18 is a flowchart illustrating a processing procedure example of SLU creation processing in a first change method of a third embodiment.

FIG. 18 is a flowchart illustrating a processing procedure example of SLU creation processing in the first change method of the third embodiment. Similarly to the SLU creation processing in the first embodiment, the SLU creation processing illustrated in FIG. 18 is performed by the configuration management unit 55.

Referring to FIG. 18, first, the configuration management unit 55 receives a request for creating an SLU 52 from an administrator or a higher-order program of a host 2 (Step S401). Hereinafter, the SLU 52 requested to be created is referred to as a new SLU.

Next, the configuration management unit 55 confirms whether or not there is control software 53 on which the number of SLUs 52 is equal to or less than a predetermined number (in detail, active control software 53 that controls a predetermined number or less of SLUs 52) by referring to a control software management table 65 and an SLU management table 63 (Step S402).

Describing the processing of Step S402 in detail, the configuration management unit 55 determines a storage controller group to which each SLU belongs based on an SLU ID 631 and an SCG ID 634 of the SLU management table 63, and further determines the control software 53 in the active state in each storage controller group based on a storage controller ID 651, a state 652, and an SCG ID 653 of the control software management table 65. As a result, the configuration management unit 55 can recognize to which control software 53 each SLU 52 belongs, and thus, the number of SLUs 52 controlled by each control software 53 can be recognized, and it can be determined whether or not the number of SLUs 52 is equal to or less than a "predetermined number". Note that the "predetermined number" may be a value determined in advance in the information processing system 1, or may be a value that is designated by the administrator or the higher-order program of the host 2 at the time of creating the SLU or the like and can be dynamically changed during operation.

Furthermore, in Step S402 illustrated in FIG. 18, only the number of SLUs 52 is simply used as a reference for determination, but as a modification, the number of SLUs 52 bound to the ALU 51 may be used as the reference for determination.

In a case where there is control software 53 on which the number of SLUs 52 is equal to or less than the predetermined number in Step S402 (YES in Step S402), the processing proceeds to Step S403, and processing similar to the SLU creation processing in the first embodiment (specifically, Steps S202 to S203 in FIG. 15) is performed. On the other hand, in a case where there is no control software 53 on which the number of SLUs 52 is equal to or less than the predetermined number in Step S402 (NO in Step S402), the processing proceeds to Step S404.

In Step S403, the configuration management unit 55 selects the control software 53 on which the SLU 52 is to be created according to a specific rule (for example, the capacity determined for each control software 53 or the number of SLUs 52). The processing of selecting the control software 53 as the creation destination in Step S403 is similar to the processing of Step S202 in FIG. 15. After Step S403 ends, the processing proceeds to Step S406.

In Step S404, the configuration management unit 55 searches for control software 53 that controls the smallest number of ALUs 51 among the control software 53 whose available capacities are larger than the capacity of the new SLU, and selects the corresponding control software 53 as a creation destination of the new SLU.

Next, the configuration management unit 55 instructs the control software 53 selected in Step S404 to create the ALU 51 and set a path between the created ALU 51 and the host 2 (Step S405). The path setting processing of Step S405 is performed by processing similar to Steps S104 to S106 in FIG. 14. After Step S405 ends, the processing proceeds to Step S406.

Finally, the configuration management unit 55 designates the control software 53 selected in Step S403 or Step S404 to create the new SLU, updates the SLU management table 63 with information regarding the created SLU 52 (Step S406), and ends the SLU creation processing.

As described above, according to the first change method, in the SLU creation processing, the configuration management unit 55 can cause control software 53 that controls a small number of SLUs to create an SLU based on the number of SLUs and/or ALUs for each control software 53 (in other words, each storage controller group), or in a case where there is no control software 53 that controls a small number of SLUs, the configuration management unit 55 can cause control software 53 that controls a small number of ALUs to create a new SLU after adding an ALU to be directly bound to the SLU to be newly created. That is, in the first change method, the storage node 3 additionally creates an ALU based on an increase in number of SLUs due to the creation of an SLU during system operation.

(3-2) Second Change Method

Figure 19:
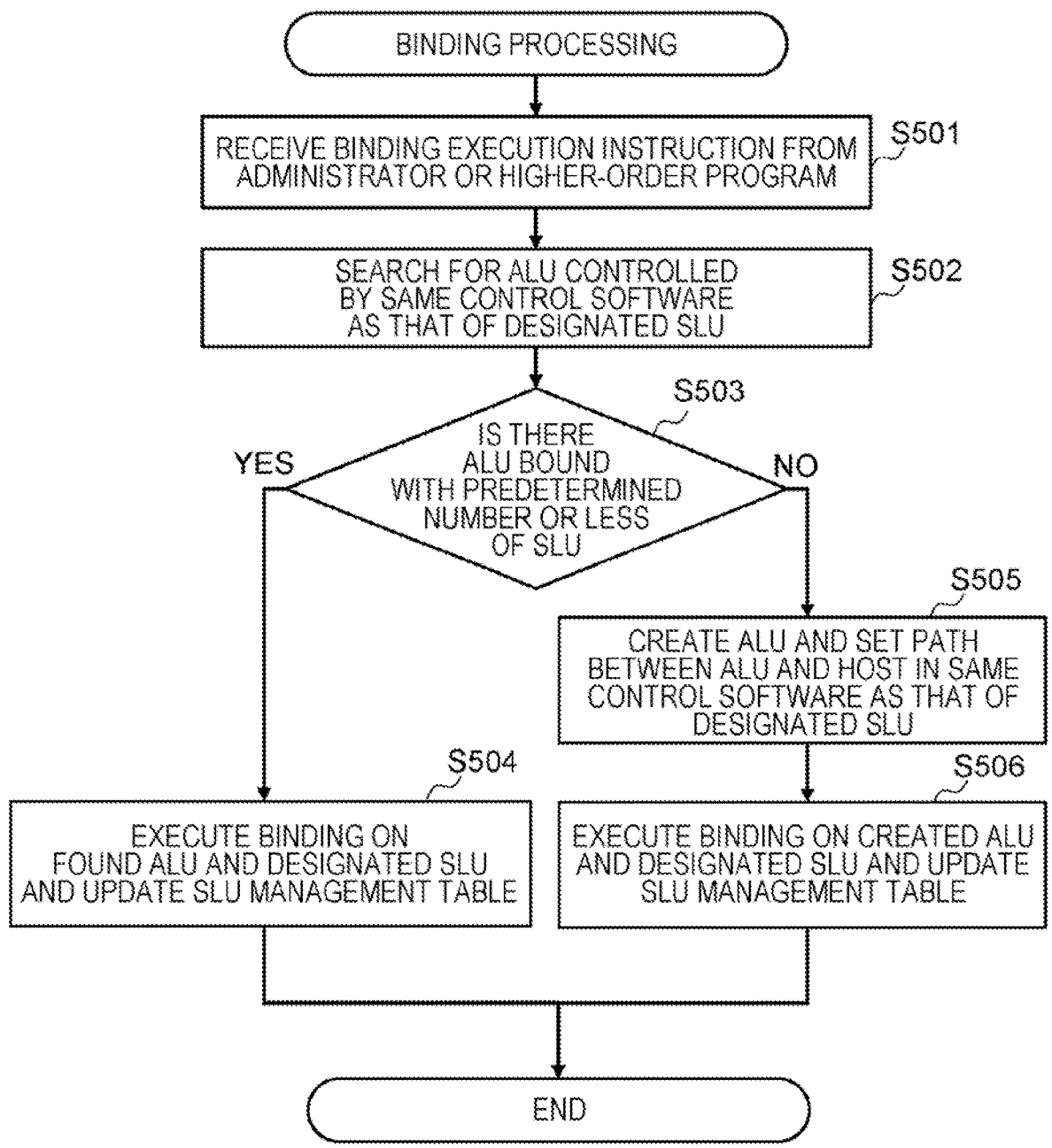
FIG. 19 is a flowchart illustrating a processing procedure example of binding processing in a second change method of the third embodiment.

FIG. 19 is a flowchart illustrating a processing procedure example of binding processing in the second change method of the third embodiment. Similarly to the binding processing in the first embodiment, the binding processing illustrated in FIG. 19 is performed by the configuration management unit 55.

Referring to FIG. 19, first, the configuration management unit 55 receives a binding execution request from the administrator or the higher-order program of the host 2 (Step S501). In the binding execution request, an SLU 52 to be bound is designated.

Next, the configuration management unit 55 searches for an ALU 51 controlled by the same control software 53 as that of the SLU 52 designated in Step S501 by referring to an ALU management table 62 (Step S502).

Next, the configuration management unit 55 determines whether or not there is an ALU 51 bound with a predetermined number or less of SLUs 52 by referring to the SLU management table 63 (Step S503). Note that the "predetermined number" may be a value determined in advance in the information processing system 1, or may be a value that is designated by the administrator or the higher-order program of the host 2 at the time of execution of the binding processing or the SLU creation processing and can be dynamically changed during operation.

In a case where an affirmative result is obtained in Step S503 (YES in Step S503), the configuration management unit 55 executes binding on the ALU 51 found in Step S502 and the SLU 52 designated in Step S501, similarly to the binding processing in the first embodiment (specifically, Step S205 in FIG. 15), updates the SLU management table 63 with information on the executed binding (Step S504), and ends the binding processing. On the other hand, in a case where a negative result is obtained in Step S503 (NO in Step S503), the processing proceeds to Step S505.

In Step S505, the configuration management unit 55 instructs the same control software 53 as that of the SLU 52 designated in Step S501 to create the ALU 51 and set a path between the created ALU 51 and the host 2 (Step S505). The path setting processing of Step S505 is performed by processing similar to Steps S104 to S106 in FIG. 14.

Next, the configuration management unit 55 executes binding on the ALU 51 created in Step S505 and the SLU 52 designated in Step S501, updates the SLU management table 63 with information on the executed binding (Step S506), and ends the binding processing.

As described above, in the second change method, the storage node 3 additionally creates an ALU based on the current number of binding relationships between the ALU and the SLU (the number of set connection relationships between the ALU and the SLU) during system operation.

(3-3) Third Change Method

The third change method is a method of changing the number of ALUs 51 at the time of adding a storage node 3 (hereinafter, a node), and a specific procedure example thereof will be described below.

When adding a node, the configuration management unit 55 additionally creates an ALU 51 by performing Step S102 of the ALU creation processing of FIG. 14. At this time, as the third change method, the configuration management unit 55 first confirms the number of ALUs 51 for not only the control software 53 operating in a node to be added but also the control software 53 operating in all the nodes in the cluster by referring to the control software management table 65 and the ALU management table 62.

Next, when the number of nodes included in the cluster is N, in a case where the total number of ALUs 51 in the cluster is smaller than (N−1), the configuration management unit 55 causes the control software 53 to create an ALU in such a way that the total number of ALUs 51 in the respective nodes in the cluster becomes (N−1), performs binding processing on the created ALU and at least one SLU 52 in the same node, and further performs path setting between the created ALU 51 and the host 2. N as the number of nodes can also be referred to as the number of active control software 53 in the cluster. The reason why the ALU 51 is created in such a way that the number of ALUs 51 becomes (N−1) in the respective nodes in the cluster is to prepare (N−1) migration destinations of a set of the ALU 51 and the SLU 52 in accordance with the number of nodes (N−1) since (N−1) nodes other than a node to be removed exist, in a case of removing a node.

That is, in the third change method, the storage node 3 additionally creates an ALU 51 in such a way that the total number of ALUs 51 in the respective nodes is (N−1) with respect to the number N of nodes after adding a node, in a case of adding a node.

Then, as a result of creating (N−1) ALUs 51 in the respective nodes in the cluster as described above, in a case of removing any one of the N nodes in the cluster, one or more SLUs 52 (SLU group) respectively bound to the (N−1) ALUs 51 in the nodes from which a node is to be removed can be distributed as a unit to the entire (N−1) nodes that are not nodes to be removed.

Here, a specific method of distributing the SLUs 52 to other nodes at the time of removing a node is not limited to a specific method, but for example, a method is conceivable in which the capacity of one or more SLUs 52 (SLU group) bound to the ALU 51 is checked for each ALU 51 in a node to be removed, and an SLU group having a largest total capacity value is migrated to a node having a large available capacity (which may also be referred to as the control software 53 in the active state) among other (N−1) nodes that are not nodes to be removed. In this case, more specifically, an SLU group that forms a pair with each ALU 51 in a node to be removed is migrated to another node having a larger available capacity in the descending order of the total capacity value. For example, an SLU group having the largest total capacity value is migrated to another node having the largest available capacity, and an SLU group having the next largest total capacity value is migrated to another node having the next largest available capacity. Then, in a node that is a migration destination, the SLU group migrated by the control software 53 in the active state is bound with the ALU 51 of the node. According to such a distribution method, it is possible to suppress the bias of the available capacity in the entire nodes in the cluster after removing a node, and it is possible to avoid saturation of the capacity.

Furthermore, as an example of another distribution method, for one or more SLUs 52 (SLU group) each bound with the ALU 51 in a node to be reduced, each SLU group may be distributed in such a way as to reduce performance bias (for example, resource load concentration) in a migration destination node due to the migration of the SLU group. Specifically, for example, loads of a CPU 31 and the SLU 52 in the respective nodes including a node to be removed may be confirmed, and it is sufficient if migration to a node with a low load of the CPU 31 among the remaining nodes in the cluster is made in order from the SLU group with a higher load in the node to be removed. According to such a distribution method, it is possible to suppress the load bias in the entire nodes in the cluster after removing a node, and it is possible to expect improvement in performance in the entire nodes.

In the first embodiment, at least one ALU 51 is created for each storage controller (a combination of the active control software 53 and the standby control software 53). However, in the third embodiment, as described above, at least one of the first to third change methods or a combination thereof is adopted, so that the number of ALUs 51 in each storage node 3 can be changed during system operation of the system, and a path between an additionally created ALU 51 and the host 2 can be set.

In the information processing system 1 in which an ALU 51 is additionally created as described above, since the number of combinations of the ALU 51 and the SLU 52 can be changed to plural, even when migrating the ALU 51 and the SLU 52 of a node to be removed without stopping IO in a case of removing a node or the like, it is possible to efficiently distribute and migrate a set of the ALU 51 and the SLU 52 to one or more other control software 53 while enabling straight connection of a path and binding at a migration destination node.

(4) Fourth Embodiment

An information processing system 1 according to a fourth embodiment will be described focusing on a difference from the first embodiment. A configuration and processing common to those of the first embodiment will not be described repeatedly.

The information processing system 1 according to the fourth embodiment is in consideration of performance deterioration at the time of resource migration in the information processing systems 1 according to the first to third embodiments, and is characterized in that SLUs 52 with a high load are collectively bound with the same ALU 51 and migrated to another node by performing node load adjustment processing to be described later in a case of removing a storage node 3 (hereinafter, a node) or in a case of resource migration between nodes.

For example, the information processing system 1 according to the fourth embodiment holds a system operation information management table 72 in a memory 32 of a node in addition to each information table described in the first embodiment.

FIG. 20 is a diagram illustrating an example of the system operation information management table 72. The system operation information management table 72 is data for managing load information of various resources of each storage node 3 of the information processing system 1. The system operation information management table 72 illustrated in FIG. 20 includes a node ID 721, a resource type 722, a resource ID 723, a metric 724, a time 725, and an amount 726.

The node ID 721 indicates an identifier of a storage node 3 having a target resource. The resource type 722 indicates the type of the target resource. The resource recorded in the resource type 722 is not limited to a hardware resource of the storage node 3 such as a CPU 31, ports of communication devices 34 and 35, and a drive of a storage device 33, and may be a software resource such as an ALU 51 and an SLU 52. The resource ID 723 indicates an identifier for identifying the target resource. The metric 724 indicates a metric of the load information. The time 725 indicates a measurement time of the load information. The amount 726 indicates a measured load amount. As the load amount in the ALU 51 or the SLU 52, for example, a value indicating an access frequency, such as input/output operations per second (IOPS) of read or write, is used.

The information managed in the system operation information management table 72 is not limited to the specific example illustrated in FIG. 20 as long as the information includes information necessary for the node load adjustment processing to be described later or information that enables calculation of the information.

Furthermore, in the system operation information management table 72 of FIG. 20, information regarding the ALU 51 or the SLU 52 is expressed in one table by referring to information of each SCG ID of a control software management table 65, an ALU management table 62, and an SLU management table 63 and associating the information with the same node, but operation information (load information) regarding the ALU 51 or the SLU 52 may be managed in a table different from the system operation information management table 72.

Figure 21:
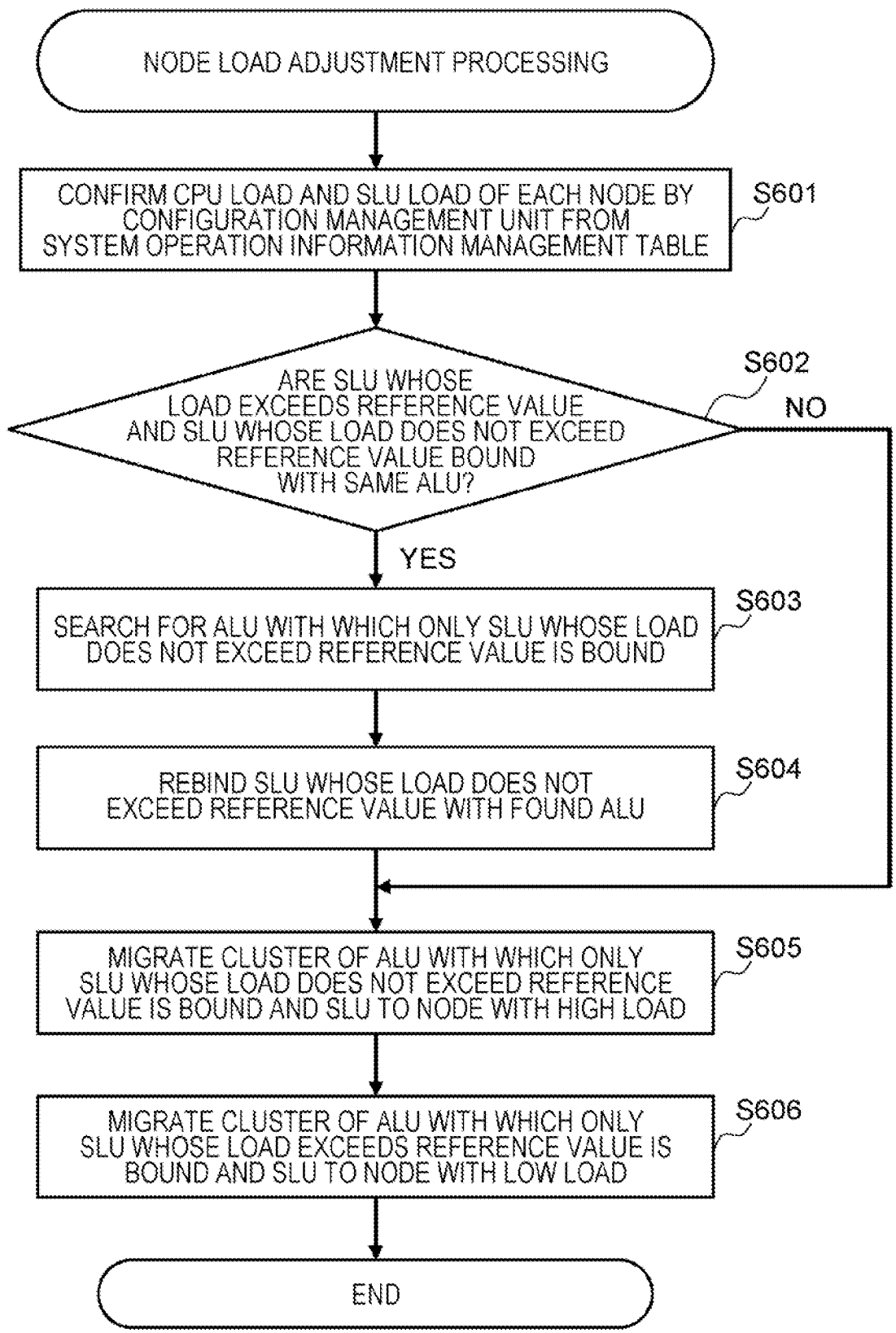
FIG. 21 is a flowchart illustrating a processing procedure example of node load adjustment processing.

FIG. 21 is a flowchart illustrating a processing procedure example of the node load adjustment processing. The node load adjustment processing is performed by a configuration management unit 55 at a predetermined timing during system operation, such as when removing a node or when migrating a resource between nodes. It is assumed that the node load adjustment processing is performed at least after the binding processing of Step S14 illustrated in FIG. 13 or FIG. 19.

Referring to FIG. 21, first, the configuration management unit 55 confirms the loads of the CPU 31 and the SLU 52 in each node by referring to the system operation information management table 72 (Step S601).

Next, the configuration management unit 55 confirms whether or not an SLU 52 whose load exceeds a reference value and an SLU 52 whose load is equal to or less than the reference value are bound with the same ALU 51 (Step S602). The "reference value" for the SLU 52 may be a value determined in advance, or a threshold value for classifying the level of the load during operation may be determined. In addition, a value designated by an administrator or a higher-order program of a host 2 may be used as the "reference value", or a predetermined program (for example, the configuration management unit 55) in the node may calculate and determine a load amount acceptable by a migration destination node based on the load information of the migration destination node. In addition, a reference value for determining a high load and a reference value for determining a low load may be different values having no overlapping section.

In a case where an affirmative result is obtained in Step S602 (YES in Step S602), the processing proceeds to Step S603, and in a case where a negative result is obtained (NO in Step S602), the processing proceeds to Step S605 described later.

In Step S603, the configuration management unit 55 searches for an ALU 52 with which only the SLU 51 whose load does not exceed the reference value is bound by referring to the system operation information management table 72 and the SLU management table 63.

Next, the configuration management unit 55 rebinds the SLU 52 (the SLU 52 whose load is equal to or less than the reference value) whose load does not exceed the reference value corresponding to the determination condition in Step S602 to the ALU 51 found in Step S603 (Step S604). The rebinding is processing of continuously executing binding with a new connection destination and unbinding of the current binding, and is mainly used when changing the ALU 51 to be bound with the SLU 52. By the processing of Step S604, only the SLU 52 whose load does not exceed the reference value is bound with the ALU 51 that is a rebinding destination. Then, only the SLU 51 whose load exceeds the reference value is bound with the ALU 52 that has not been rebound. After Step S604 ends, the processing proceeds to Step S605.

In Step S605, the configuration management unit 55 migrates, to a node with a high load, a cluster of the ALU 52 with which only the SLU 51 whose load does not exceed the reference value is bound and the SLU 52 bound with the ALU 51.

Next, the configuration management unit 55 migrates, to a node with a low load, a cluster of the ALU 52 with which only the SLU 51 whose load exceeds the reference value is bound and the SLU 52 bound with the ALU 51 (Step S606), and ends the node load adjustment processing.

The node as the migration destination in Step S605 may be selected from a node group with a relatively high load in the entire nodes, and the ALU 51 with which only the SLU 52 whose load does not exceed the reference value is bound may be migrated by being distributed to the node group with a relatively high load according to a predetermined method. Similarly, the node as the migration destination in Step S606 may be selected from a node group with a relatively low load in the entire nodes, and the ALU 51 with which only the SLU 52 whose load exceeds the reference value is bound may be migrated by being distributed to the node group with a relatively low load according to a predetermined method.

As described above, in the information processing system 1 according to the fourth embodiment, the node load adjustment processing is performed when removing a node or when performing resource migration between nodes, so that a plurality of SLUs 52 are collectively bound to different ALUs 51 based on the level of the load, and the cluster of the bound ALUs 51 and SLUs 52 is migrated to a different node, thereby making it possible to suppress the load bias in the entire nodes. As a result, in the information processing system 1, variations in performance between nodes are suppressed at the time of resource migration, and improvement in performance in the entire nodes can be expected.

In the above description, a case where SLUs 52 with a high load are collectively migrated to another node in the node load adjustment processing has been described. However, as a modification of the present embodiment, the load (for example, a CPU utilization rate) of a migration destination node may be confirmed, and only SLUs 52 having a performance value that can withstand a node load after migration (only the total value of the loads may be considered instead of the level of the load) may be collectively bound with the same ALU 51, and a cluster of them may be migrated to the migration destination node. In a case of such a modification, the SLU 52 can reliably exhibit a predetermined performance value even after migration to a node.

(5) Fifth Embodiment

The information processing systems 1 of the first to fourth embodiments described above have a configuration in which the host 2 including a higher-order program (for example, the VM 41) that outputs an IO request and the storage node 3 that is a target of the IO request are separated. However, in the present invention, configuration management of the ALU and the SLU is one of the important features, and the applicable range is not limited to the information processing system with the above-described separate configuration.

Therefore, in the fifth embodiment, an information processing system 8 having a hyperconverged infrastructure (HCI) configuration in which a host (or VM) and a storage are arranged in the same node will be described as an example in which the present invention is applied to an information processing system having a device configuration different from that of the information processing systems 1 according to the first to fourth embodiments. In the fifth embodiment, differences from the first to fourth embodiments will be mainly described, and components and processings common to the first to fourth embodiments are denoted by common reference numerals, and an overlapping description will be omitted.

Figure 22:
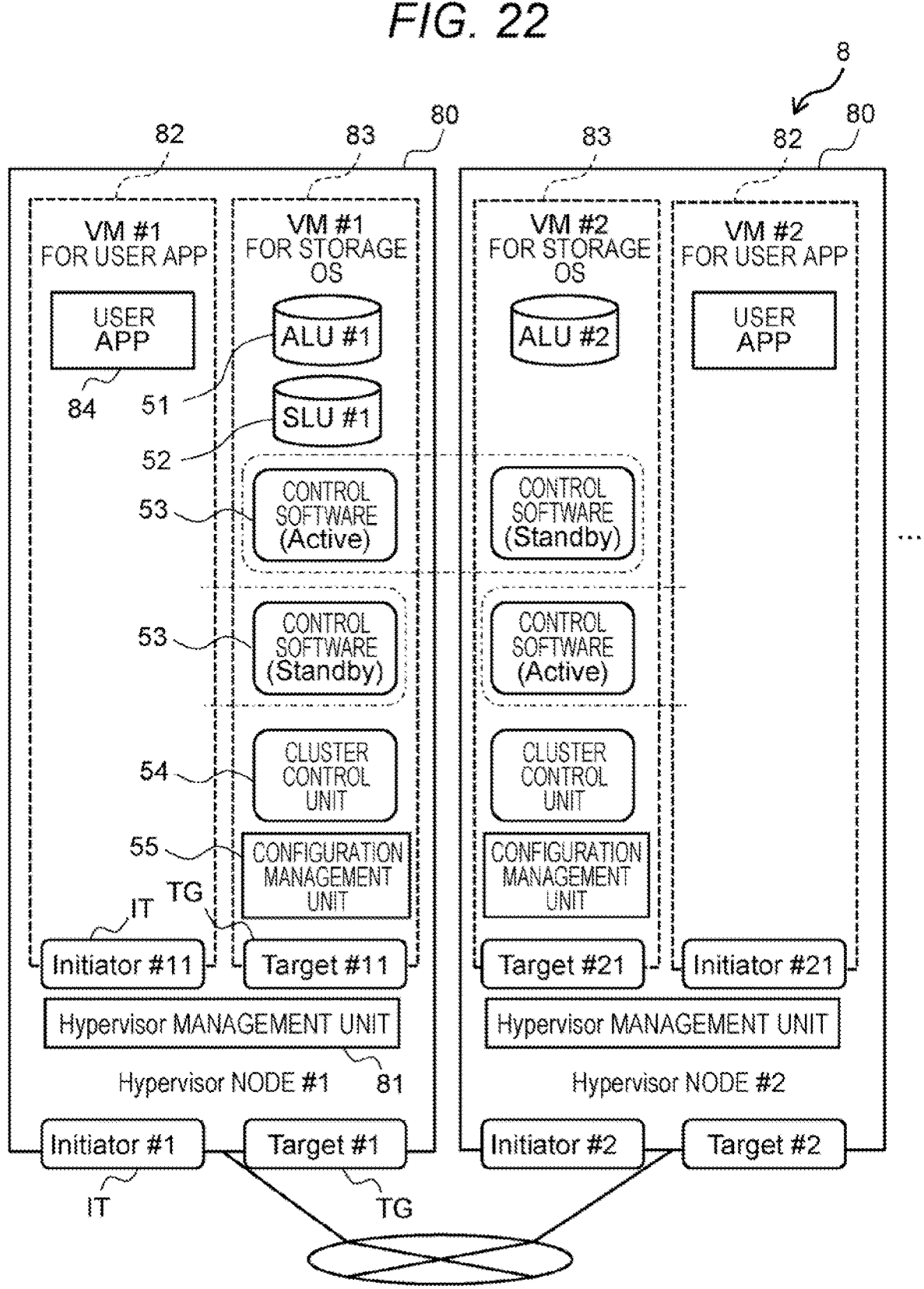
FIG. 22 is a block diagram illustrating a configuration example of an information processing system according to a fifth embodiment.

FIG. 22 is a block diagram illustrating a configuration example of the information processing system 8 according to the fifth embodiment. The information processing system 8 is an information processing system having the HCI configuration, and includes a plurality of hypervisor nodes 80 connected via a network outside the nodes.

The HCI is an integrated system in which functions of a higher-order node and a storage node are aggregated in one physical computer node (the hypervisor node 80 in FIG. 22). In the HCI, not only storage software but also an application, middleware, management software, a container, and the like are operated on an OS or a hypervisor installed in each computer node, thereby enabling execution of a plurality of processings in one computer node.

In the information processing system 8 illustrated in FIG. 22, in each hypervisor node 80, a user APP VM 82 that corresponds to the host 2 in the first to fourth embodiments and in which a user application (user APP 84) operates and a storage OS VM 83 in which various programs (the control software 53, the cluster control unit 54, and the configuration management unit 55) of the storage node 3 in the first, third, and fourth embodiments operate are co-located on a hypervisor as a base. Then, the information processing system 8 forms a cluster by arranging a plurality of such hypervisors. Each hypervisor node 80 includes a hypervisor management unit 81 that manages IO and configurations of the VMs 82 and 83 operating on the hypervisor. Since the hypervisor management unit 81 is a program having a general hypervisor management function, a detailed description of the operation will be omitted.

The hypervisor node 80 includes an initiator IT (for example, initiator #1) and a target TG (for example, target #1) associated with physical ports of the hypervisor node 80, and a virtual initiator IT (for example, initiator #11) and a target TG (for example, target #11) associated with virtual ports of the VMs 82 and 83. Then, setting of a path for connecting the user APP VM 82 and an ALU 51 on the storage OS VM 83 is made using the port of the virtual initiator IT and the port of the virtual target TG.

Then, various tables (similar to the various tables illustrated in FIG. 6) managed by a memory in the storage OS VM 83 manage the virtual information as described above. The SLU management table needs a configuration different from that of the first to fourth embodiments, which will be described later with reference to FIG. 23. In addition, various programs (control software 53, a cluster control unit 54, and a configuration management unit 55) held in the memory in the storage OS VM 83 basically execute operation control similar to that of the first, third, and fourth embodiments. A difference between the fifth embodiment and the second embodiment will be described later with reference to FIG. 24.

FIG. 23 is a diagram illustrating an example of an SLU management table 91 according to the fifth embodiment. The SLU management table 91 of FIG. 23 is different from the SLU management table 71 illustrated in FIG. 16 in the second embodiment in that an APP node ID 917 is added, and information indicated by other data items (an SLU ID 911, a name 912, a capacity 913, an SCG ID 914, an ALU ID 915, and an APP ID 916) is similar to the information indicated by the data items having the same names in the SLU management table 71. For example, the APP ID 916 is information for designating the user APP 84 that accesses an SLU 52 to be managed and operates.

The APP node ID 917 is an identifier indicating a node (hypervisor node 80) in which a user application (user APP 84) using the SLU 52 to be managed exists, and is indicated by a node ID assigned to each hypervisor node 80. The APP node ID 917 is information used to create the SLU 52 on the control software 53 existing in the same node (hypervisor node 80) as that of the user APP VM 82 in SLU creation processing illustrated in FIG. 24, and is designated when an administrator or the user APP 84 makes an SLU creation request.

In the second embodiment described above, the SLUs 52 used by the same application are created on the same control software 53. However, in the information processing system 8 according to the fifth embodiment having the HCI configuration, the SLU 52 used by the same application (user APP 84) is created on the same control software 53 in the same node as that of the application, and thus, it is possible to expect similar or better effects than those of the second embodiment. That is, in a case where the storage OS VM 83 in which the SLU 52 exists and the user APP VM 82 using the SLU 52 straddle nodes, there is a possibility that IO performance deteriorates because IO processing is performed via an external network. However, in a case where the storage OS VM 83 in which the SLU 52 exists and the user APP VM 82 using the SLU 52 are in the same node, the IO processing can be performed via an intra-hypervisor network, so that high IO performance can be obtained. Therefore, in the fifth embodiment, by the SLU creation processing illustrated in FIG. 24, all the SLUs 52 included in the user APP VM 82 are created on the control software 53 existing in the same node as that of the user APP VM 82.

Figure 24:
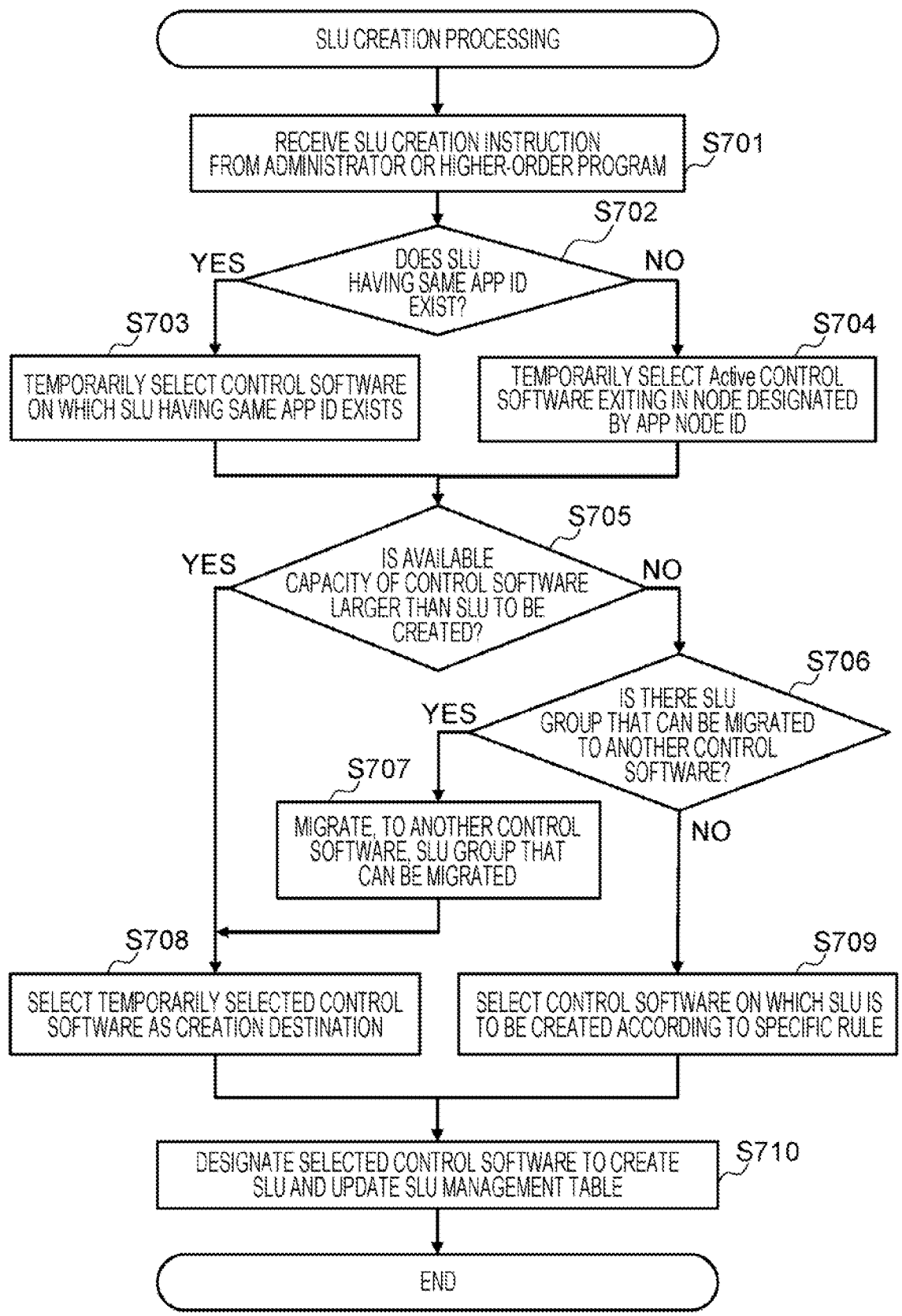
FIG. 24 is a flowchart illustrating a processing procedure example of SLU creation processing according to the fifth embodiment.

FIG. 24 is a flowchart illustrating a processing procedure example of the SLU creation processing according to the fifth embodiment. Similarly to the SLU creation processing (see FIG. 17) in the second embodiment, the SLU creation processing illustrated in FIG. 24 is performed by the configuration management unit 55.

The SLU creation processing according to the fifth embodiment illustrated in FIG. 24 is different from the SLU creation processing according to the second embodiment illustrated in FIG. 17 mainly in Steps S701, S703, and S704. Hereinafter, these different processings will be described.

In Step S701, the configuration management unit 55 receives a request for creating an SLU 52 from the administrator or the higher-order program of the user APP VM 82. At this time, in the SLU creation request, in addition to a capacity of the new SLU and an ID (APP ID) of an application that uses the new SLU, an ID (APP node ID) of a node where the application exists is designated.

Step S703 is processing performed in a case where it is determined in Step S702 that an SLU 52 (existing SLU) having the same purpose of use as the new SLU has been created, and the configuration management unit 55 temporarily selects, as a creation destination of the new SLU, control software 53 on which the existing SLU having the same APP ID designated in Step S701 exists. In Step S703, the control software 53 to be temporarily selected is determined based on the APP ID, but the same result is obtained even in a case of temporarily selecting the control software 53 based on the APP node ID.

Step S704 is processing performed in a case where it is determined in Step S702 that the SLU 52 (existing SLU) having the same purpose of use as the new SLU has not been created, and the configuration management unit 55 temporarily selects, as a creation destination of the new SLU, active control software 53 in a node (hypervisor node 80) indicated by the APP node ID designated in Step S701.

The processings of Steps S703 and S704 are processings for checking whether or not a new SLU can be created in the node indicated by the APP node ID. In the fifth embodiment, control software 53 operating in the node designated by the APP node ID is selected as a creation destination of the new SLU as much as possible.

The processings from Step S705 are similar to the processings from Step S303 in FIG. 17. Briefly, in a case where the control software 53 temporarily selected in Step S703 or Step S704 has an available capacity that can be used to create a new SLU, the control software 53 creates a new SLU (YES in Step S705, Step S708, and Step S710). In a case where the temporarily selected control software does not have a sufficient available capacity, it is determined whether or not an existing SLU can be migrated to another control software 53, and in a case where the migration is possible, the existing SLU is migrated and then a new SLU is created by the temporarily selected control software 53 (No in Step S705, YES in Step S706, Step S707, Step S708, and Step S710). In a case where the migration is not possible, a new SLU is created after selecting another control software 53 as a creation destination of the new SLU according to a specific rule (NO in Step S705, No in Step S706, Step S709, and Step S710).

As described above with reference to FIG. 24, the SLU creation processing according to the fifth embodiment is characterized in that the control software 53 operating in the node designated by the APP node ID is selected as a creation destination of a new SLU as much as possible in the selection of the control software 53 as the creation destination at the time of creating an SLU. Then, in a case where the SLU 52 is created by the control software 53 operating in the node designated by the APP node ID, since the storage OS VM 83 in which the SLU 52 exists and the user APP VM 82 using the SLU 52 exist in the same node, IO processing for the SLU 52 is performed via the intra-hypervisor network. Therefore, the information processing system 8 according to the fifth embodiment can obtain high IO performance and reliability similarly to the information processing system 1 according to the second embodiment.

In addition, although a detailed description is omitted to avoid redundant explanation, in the information processing system 8 according to the fifth embodiment, the storage OS VM 83 includes various programs for executing similar operations to those of the storage node 3 in the first, third, and fourth embodiments, and it is thus possible to obtain similar effects to those of the first, third, and fourth embodiments.

As a modification of the information processing system 8 according to the fifth embodiment, a configuration of a container may be used instead of the HCI. In a case of the HCI, the hypervisor is used as a base, but in a case of the container, an OS operates on a bare metal server, and as a set of processes thereon, a set corresponding to a storage OS (storage OS container) or a user APP container operates. Even in such a configuration of the container, the VM and the storage are arranged in the same node similarly to the HCI, and it is thus possible to apply the present invention.

What is claimed is:

1. An information processing system comprising:
a plurality of storage nodes each including:
one or more processors; and
a storage device,
wherein the plurality of storage nodes are connected by a network,
wherein the storage node includes:
a first logical unit that is a logical storage region;
a second logical unit that has a connection relationship with the first logical unit and serves as a reception port of an input/output (IO) request for data stored in the first logical unit having the connection relationship; and
a control unit that operates on the processor and processes the IO request with respect to the first logical unit,
wherein a plurality of the control units implemented in different storage nodes are managed as a redundancy group, and one or more first logical units are associated with the redundancy group,
wherein the plurality of control units included in the redundancy group include an active control unit that processes the IO request with respect to the first logical unit associated with the redundancy group and a standby control unit that takes over the processing when the active control unit fails, and
wherein the processor arranges at least one second logical unit in the storage node in which the active control unit exists, and associates the second logical unit with the first logical unit controlled by the active control unit,
wherein, when arranging the redundancy group in the storage node, the processor performs:
second logical unit creation processing of creating the second logical unit in a same storage node as that of the active control unit of the redundancy group;
path setting processing of setting a path serving as an IO path between the second logical unit created in the second logical unit creation processing and a higher-order device;
first logical unit creation processing of creating the first logical unit in the same storage node as that of the active control unit; and
binding processing of setting the connection relationship between the first logical unit created in the first logical unit creation processing and the second logical unit in the same storage node.

2. The information processing system according to claim 1, wherein in the path setting processing, the processor sets a plurality of paths passing through any ports of a plurality of storage nodes between the higher-order device and the second logical unit, the ports through which the plurality of paths pass exist in the plurality of storage nodes, and the storage nodes in which the ports through which the plurality of paths pass exist include the storage node in which the active control unit exists and the storage node in which the standby control unit exists.

3. The information processing system according to claim 2, wherein in the path setting processing, the processor sets, as a prioritized path to be preferentially used, a path passing through the port of the storage node in which the active control unit that controls the second logical unit exists among the plurality of set paths, and the processor sets, as a redundant path that is changed to the prioritized path at a time of failover, a path passing through the storage node in which the standby control unit that takes over the processing performed by the active control unit at a time of a configuration change due to the failover exists among the plurality of set paths.

4. The information processing system according to claim 1, wherein in the first logical unit creation processing, the processor selects the active control unit of the redundancy group for creating the first logical unit based on a capacity of the first logical unit to be created and an available capacity of the redundancy group.

5. The information processing system according to claim 1, wherein in the binding processing, the processor sets the connection relationship between the first logical unit created in the first logical unit creation processing and the second logical unit controlled by the same active control unit as that of the first logical unit.

6. The information processing system according to claim 5, wherein in the binding processing, in a case where there are a plurality of the second logical units controlled by the same active control unit as that of the first logical unit created in the first logical unit creation processing, the processor sets the connection relationship for the second logical unit having a smallest number of set connection relationships with the first logical unit.

7. The information processing system according to claim 1, wherein in the first logical unit creation processing, in a case where an application of the higher-order device that accesses a new first logical unit to be created accesses an existing first logical unit, the processor creates the new first logical unit in association with the active control unit that controls the existing first logical unit.

8. The information processing system according to claim 7, wherein in the first logical unit creation processing, in a case where a capacity required for creating the new first logical unit is insufficient in the active control unit that controls the existing first logical unit, the processor migrates another first logical unit of the storage node in which the active control unit exists to another storage node, and creates the new first logical unit in association with the active control unit.

9. The information processing system according to claim 1, wherein the processor is configured to perform the first logical unit creation processing in response to a first logical unit creation instruction, and in the first logical unit creation processing, in a case where there is no active control unit that controls a predetermined number or less of first logical units in the plurality of storage nodes, the processor selects the active control unit that has an available capacity required for a new first logical unit designated by the creation instruction and controls a smallest number of second logical units, performs the second logical unit creation processing to create the second logical unit, and creates the new first logical unit to be associated with the created second logical unit.

10. The information processing system according to claim 1, wherein the processor is configured to perform the binding processing according to a connection relationship setting instruction in which the first logical unit to be connected is designated, and in the binding processing, in a case where a number of set connection relationships for the second logical unit controlled by the same active control unit as that of the first logical unit to be connected exceeds a predetermined number, the processor creates the second logical unit and migrates the connection relationship with the first logical unit to be connected to the created second logical unit.

11. The information processing system according to claim 1, wherein in a case where a number of storage nodes is increased to N, the processor performs the second logical unit creation processing in such a way that the number of second logical units arranged in the respective storage nodes becomes N−1, and performs the path setting processing after setting the connection relationship between the first logical unit in the same storage node and the second logical unit created in the second logical unit creation processing, and in a case where any one of the N storage nodes is removed, the first logical unit in the storage node is arrangeable by being distributed to N−1 storage nodes other than the storage node.

12. The information processing system according to claim 1, wherein the processor classifies the plurality of first logical units into a low-load logical unit group and a high-load logical unit group, and sets the connection relationship with a different second logical unit for each classified logical unit group, and the processor performs node load adjustment processing of migrating the low-load logical unit group and the second logical unit having the connection relationship with the logical unit group to a storage node with a high load among the plurality of storage nodes, and migrating the high-load logical unit group and the second logical unit having the connection relationship with the logical unit group to a storage node with a low load among the plurality of storage nodes.

13. The information processing system according to claim 1, wherein the information processing system is an information processing system including a plurality of computer nodes connected via a network, a storage virtual machine that implements a function corresponding to one storage node, and a higher-order device virtual machine that includes an application that operates by accessing any one first logical unit and implements a function corresponding to one higher-order device are implemented as virtual machines that operate on a hypervisor in each of the computer nodes, and in the first logical unit creation processing, in a case where the application that accesses a new first logical unit to be created accesses an existing first logical unit, the processor creates the new first logical unit in association with the active control unit that controls the existing first logical unit.

14. A configuration management method of an information processing system including a plurality of storage nodes each including:

one or more processors; and a storage device, wherein the plurality of storage nodes are connected by a network, wherein the storage node includes:
  a first logical unit that is a logical storage region;
  a second logical unit that has a connection relationship with the first logical unit and serves as a reception port of an input/output (IO) request for data stored in the first logical unit having the connection relationship; and
  a control unit that operates on the processor and processes the IO request with respect to the first logical unit, wherein a plurality of the control units implemented in different storage nodes are managed as a redundancy group, and one or more first logical units are associated with the redundancy group, wherein the plurality of control units included in the redundancy group include an active control unit that processes the IO request with respect to the first logical unit associated with the redundancy group and a standby control unit that takes over the processing when the active control unit fails, and wherein the processor arranges at least one second logical unit in the storage node in which the active control unit exists, and associates the second logical unit with the first logical unit controlled by the active control unit, wherein, when arranging the redundancy group in the storage node, the processor performs:
  second logical unit creation processing of creating the second logical unit in a same storage node as that of the active control unit of the redundancy group;
  path setting processing of setting a path serving as an IO path between the second logical unit created in the second logical unit creation processing and a higher-order device;
  first logical unit creation processing of creating the first logical unit in the same storage node as that of the active control unit; and
  binding processing of setting the connection relationship between the first logical unit created in the first logical unit creation processing and the second logical unit in the same storage node.

* * * * *